United States Patent
Wimmer

(10) Patent No.: US 12,044,284 B2
(45) Date of Patent: Jul. 23, 2024

(54) VALVE ARRANGEMENT FOR A VIBRATION DAMPER

(71) Applicant: KTM AG, Mattighofen (AT)

(72) Inventor: Johannes Wimmer, Kastl (DE)

(73) Assignee: KTM AG, Mattighofen (AT)

( * ) Notice: Subject to any disclaimer, the term of this patent is extended or adjusted under 35 U.S.C. 154(b) by 90 days.

(21) Appl. No.: 17/552,563

(22) Filed: Dec. 16, 2021

(65) Prior Publication Data

US 2022/0196106 A1  Jun. 23, 2022

(30) Foreign Application Priority Data

Dec. 23, 2020  (DE) ............. 10 2020 134 820.7

(51) Int. Cl.
*F16F 9/34* (2006.01)
*F16F 9/18* (2006.01)
(Continued)

(52) U.S. Cl.
CPC ............. *F16F 9/3484* (2013.01); *F16F 9/18* (2013.01); *F16F 9/369* (2013.01); *F16F 9/465* (2013.01);
(Continued)

(58) Field of Classification Search
CPC .... F16F 9/18; F16F 9/34; F16F 9/3484; F16F 9/364; F16F 9/465; F16F 2222/12; F16F 2228/066; F16F 2232/08; F16F 2234/02; F16K 15/148; F16K 27/0209; F16K 31/402
See application file for complete search history.

(56) References Cited

U.S. PATENT DOCUMENTS 4,088,207 A * 5/1978 Kato ............. F16F 9/3484
188/282.5
4,785,920 A * 11/1988 Knecht ............. B60G 17/0152
251/129.05
(Continued)

FOREIGN PATENT DOCUMENTS

EP   3 208 489 B1   4/2020
KR   100 443 884 B1  8/2004
WO   2020026362 A1   2/2020

OTHER PUBLICATIONS

European Patent Office, Extended European Search Report (EESR) on European Patent Application No. 21206193.1; May 13, 2022.

*Primary Examiner* — Bradley T King
*Assistant Examiner* — James K Hsiao
(74) *Attorney, Agent, or Firm* — Rod D. Baker

(57) ABSTRACT

A valve arrangement for a vibration damper, as may be used on a vehicle. The vibration damper can be a telescopic suspension fork leg of a motorbike, or a shock absorber for a vehicle with more than one track, for example an automobile. The valve arrangement is for a vibration damper that has a valve housing with an annular valve seat, and is configured to receive damping fluid, and further having a valve piston arranged in an axially displaceable manner relative to the valve seat in an inner space of the valve housing. The valve piston has a main valve which has a flexible circular valve disc which can be removed from contact with a contact surface side on the valve seat. The valve disc is arranged on the valve piston by a guide pin, such that it can be moved axially relative to the latter and is guided radially.

18 Claims, 15 Drawing Sheets

(51) Int. Cl.
*F16F 9/348* (2006.01)
*F16F 9/36* (2006.01)
*F16F 9/46* (2006.01)
*F16K 15/14* (2006.01)
*F16K 27/02* (2006.01)
*F16K 31/40* (2006.01)

(52) U.S. Cl.
CPC ........ F16K 15/148 (2013.01); F16K 27/0209 (2013.01); F16K 31/402 (2013.01); *F16F 2222/12* (2013.01); *F16F 2228/066* (2013.01); *F16F 2232/08* (2013.01); *F16F 2234/02* (2013.01)

(56) References Cited

U.S. PATENT DOCUMENTS

| | | | | |
|---|---|---|---|---|
| 4,964,493 A * | 10/1990 | Yamaura | ............... | F16F 9/3484 188/280 |
| 5,211,420 A * | 5/1993 | Iwashita | ............... | B62K 25/08 280/5.513 |
| 5,261,448 A * | 11/1993 | Furuya | ............... | F16F 9/348 137/513.5 |
| 5,316,113 A * | 5/1994 | Yamaoka | ............... | F16F 9/3484 188/320 |
| 5,529,154 A * | 6/1996 | Tanaka | ............... | F16F 9/3484 188/280 |
| 7,980,368 B2 * | 7/2011 | Park | ............... | F16F 9/3484 188/316 |
| 8,794,400 B2 * | 8/2014 | Nakadate | ............... | F16F 9/464 188/266.6 |
| 9,500,251 B2 * | 11/2016 | Rummel | ............... | F16F 9/18 |
| 9,599,183 B2 * | 3/2017 | Kamakura | ............... | F16F 9/464 |
| 9,644,760 B2 * | 5/2017 | Mori | ............... | F16F 9/465 |
| 9,777,790 B2 * | 10/2017 | Mizuno | ............... | F16F 9/3485 |
| 9,845,839 B2 * | 12/2017 | Rummel | ............... | F16F 9/18 |
| 10,344,820 B2 * | 7/2019 | Cox | ............... | F16F 9/348 |
| 10,801,576 B2 * | 10/2020 | Hoven | ............... | F16F 9/465 |
| 10,830,305 B2 * | 11/2020 | Sakuta | ............... | F16F 9/46 |
| 10,989,266 B2 * | 4/2021 | Malmborg | ............... | F16F 9/34 |
| 2006/0225976 A1 * | 10/2006 | Nakadate | ............... | F16F 9/3484 188/266 |
| 2008/0185245 A1 * | 8/2008 | Park | ............... | F16F 9/465 188/322.15 |
| 2008/0185246 A1 * | 8/2008 | Park | ............... | F16F 9/3485 188/322.15 |
| 2009/0260938 A1 * | 10/2009 | Hikosaka | ............... | F16F 9/3484 188/322.15 |
| 2012/0305348 A1 * | 12/2012 | Katayama | ............... | F16F 9/464 188/266.2 |
| 2012/0305349 A1 * | 12/2012 | Murakami | ............... | F16F 9/325 188/266.6 |
| 2014/0060315 A1 * | 3/2014 | Mori | ............... | F16F 9/348 91/418 |
| 2014/0262655 A1 * | 9/2014 | Tuts | ............... | F16F 9/512 188/322.15 |
| 2014/0332332 A1 * | 11/2014 | Lawler | ............... | F16F 9/3484 188/313 |
| 2015/0034182 A1 * | 2/2015 | Ashiba | ............... | F16F 9/062 137/514.7 |
| 2016/0025178 A1 * | 1/2016 | Kamakura | ............... | F16F 9/464 251/25 |
| 2016/0025237 A1 * | 1/2016 | Mori | ............... | F16K 1/36 251/30.01 |
| 2016/0356335 A1 * | 12/2016 | Nomura | ............... | F16F 9/19 |
| 2017/0082169 A1 * | 3/2017 | Kim | ............... | F16F 9/3488 |
| 2018/0281893 A1 * | 10/2018 | Awano | ............... | B62K 25/08 |
| 2019/0048967 A1 * | 2/2019 | Hovèn | ............... | F16F 9/19 |
| 2020/0208707 A1 * | 7/2020 | Nakano | ............... | F16F 9/3484 |
| 2020/0355239 A1 * | 11/2020 | Wrzesinski | ............... | F16F 9/3278 |
| 2021/0025471 A1 * | 1/2021 | Kobayashi | ............... | F16F 9/185 |
| 2021/0131517 A1 * | 5/2021 | Yasui | ............... | F16F 9/3481 |
| 2021/0301898 A1 * | 9/2021 | Montagna | ............... | F16F 9/50 |

* cited by examiner

VALVE ARRANGEMENT FOR A VIBRATION DAMPER

CROSS-REFERENCE TO RELATED APPLICATIONS

This application claims the filing benefit of and priority to German Patent Application No. DE 10 2020 134 820.7 filed on 23 Dec. 2020, the entirety of which is incorporated herein by reference.

BACKGROUND OF THE INVENTION

Field of the Invention

The present invention relates to a valve arrangement for a vibration damper, as may be used on a vehicle. The vibration damper can be, for example, a telescopic suspension fork leg of a motorbike or a shock absorber for a vehicle with more than one track, for example a passenger car; the vibration damper can also be provided for use in the industrial sector.

Background Art

On the basis of European Patent Publication EP 3208489 B1, a valve arrangement having a pilot valve is known which has a disc-shaped valve body which can be brought into contact with two control edges, namely, with a radially inner control edge (which is provided with a flow-through opening such that damping fluid can flow into an adjacent recess and can act on the valve body up to a region) which rests on a radially outer control edge. In this way, the disc-shaped valve body can lift slightly from the radially outer control edge during the spring deflection movement of the vibration damper provided with it, to prevent a jerky or abrupt opening of the main valve—but not during the rebound movement acting on the vibration damper. When the rebound movement begins, the disc-shaped valve body is lifted upwards in a position separate from the two control edges, and the flow-through opening between the two openings through which the damping fluid flows is open.

This known valve arrangement has the disadvantage that the disc-shaped valve body rests against the inner recess of the valve housing with a radially outer region of the valve body. The valve body in the form of a valve disc is, therefore, guided externally in the housing. When the valve body is in the position raised from the control edges and the rebound movement begins, the disc-shaped valve body is pressurised from the upper side by the damping fluid. This pressurization causes the valve body to skew and tilt undesirably relative to the inner recess and therefore to assume an undefined position.

In view of the forgoing known art, an object of the present invention is to provide a valve arrangement which, on one hand, eliminates the problem of tilting of the valve disc and, on the other hand, enables a smooth and even opening of the main valve during both the spring deflection movement and during the rebound movement. A vibration damper is provided which provides a comfortable transition from the spring deflection movement to the rebound movement. A vehicle having such a vibration damper is also provided.

SUMMARY OF THE INVENTION

There is disclosed a valve arrangement for a vibration damper, as may be used on a vehicle. The vibration damper can be, for example, a telescopic suspension fork leg of a motorbike, or a shock absorber for a vehicle with more than one track, such as a passenger car. The vibration damper may also find beneficial use in the industrial sector, in machinery equipment and systems.

To influence the damping behavior of such a vibration damper, the valve arrangement can have a pilot valve which acts as a pressure regulator. The damper device or the vibration damper usually has two fluid chambers, between which damping fluid is exchanged. The fluid chambers are a first chamber or pressure stage chamber and a second chamber or rebound chamber. Damping fluid flows from the pressure stage chamber towards the second chamber or rebound chamber during the compression of the damper device. During the spring decompression process or rebound, damping fluid flows from the rebound chamber towards the pressure stage chamber, wherein the damping fluid flows through the valve arrangement, which helps in performing damping work and in dampening the vibration amplitudes acting on the damping device.

The pilot valve can be used to influence the opening behavior of the valve assembly or pre-controlled valve by building up a control pressure in a pre-control chamber which pressure acts on the valve piston of the main valve or a valve assembly arranged on the valve piston.

The damper force changes with the speed of movement of the piston rod on which the valve piston is arranged.

When a vehicle provided with a vibration damper having a pre-controlled valve drives over a bump in the road, this causes the piston rod to move at a certain speed. If this speed increases, for example, depending on the amount of force applied to the piston rod, this leads to a higher damper force and the main valve located on the valve piston then opens suddenly or abruptly and there is a sharp bend in the diagram of the damper force plotted against the piston rod speed or damper speed. This sharp bend in the force characteristic curve plotted against the damper speed is noticeable when driving the vehicle in the form of a loss of comfort, which is often observed with a vibration damper equipped with a pre-controlled valve.

To solve this problem, the inventive apparatus includes, but is not limited to, a valve arrangement for a vibration damper that has a valve housing with an annular valve seat, and configured to receive damping fluid, and further having a valve piston arranged in an axially displaceable manner relative to the valve seat in an inner space of the valve housing. The valve piston has a main valve which has a flexible circular valve disc which can be brought detachably into contact with a contact surface side on the valve seat. The valve disc is arranged on the valve piston by means of a guide pin, such that it can be moved axially relative to the latter and is guided radially. The valve arrangement also preferably has an electromagnet with an armature for acting on a pilot valve, wherein also a flexible support disc is arranged on the bearing surface side of the valve disc facing away from the contact surface side of the valve disc, on which support disc the valve disc abuts along a partial peripheral region extending in the peripheral direction of the valve disc.

The vibration damper preferably also has a tube and a piston rod. The tube has an inner space designed to receive the damping fluid, and a pressure stage chamber (PD and a rebound chamber (PZ), configured such that the two chambers have a respective inner space which is physically separated from the valve arrangement and is designed to be in fluid communication. The foregoing summary is exemplary, and is not intended to be limiting of the scope of the invention, reference being had to the claims for that purpose.

BRIEF DESCRIPTION OF THE DRAWINGS

In the following, the invention will be explained in greater detail with reference to the drawing. In the drawing.

DETAILED DESCRIPTION OF THE INVENTION

Figure 1:
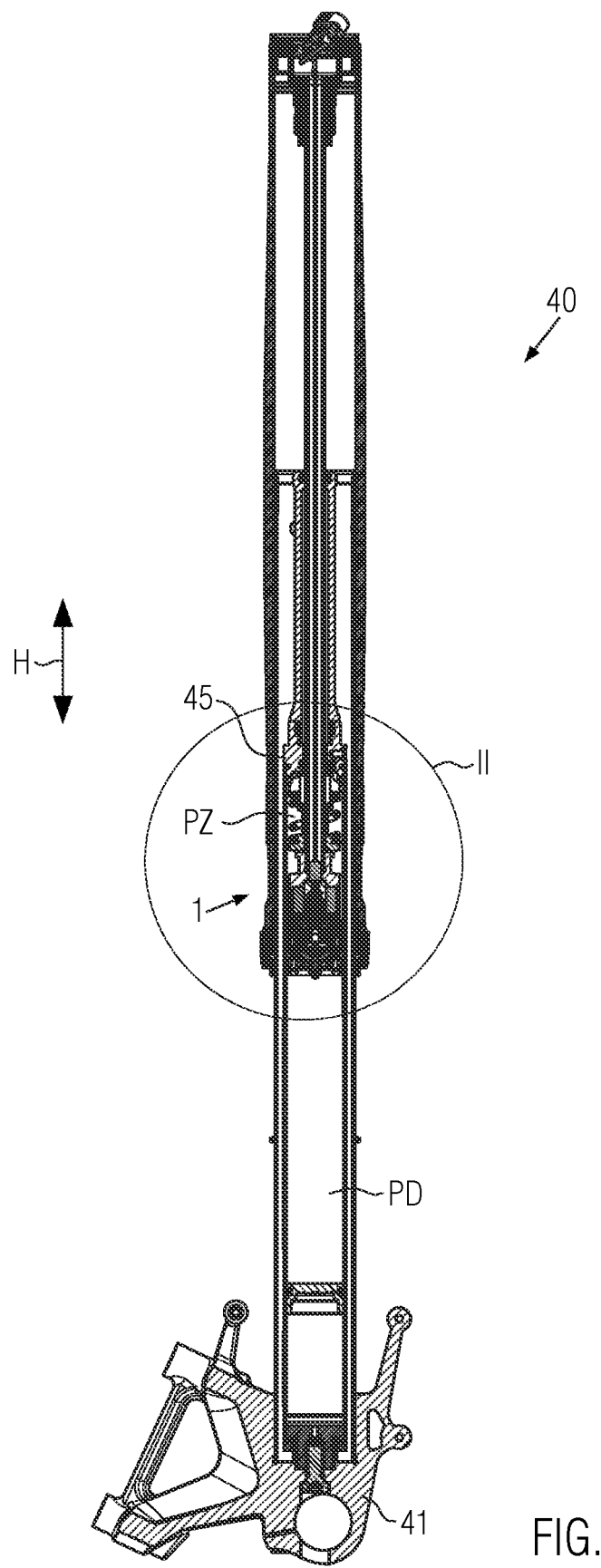
FIG. 1 is a longitudinal cross section of a telescopic suspension fork leg of a motorbike having an embodiment of a valve arrangement according to the present invention.

There is disclosed hereby a valve arrangement of a vibration damper, as may be used on a vehicle. To influence the damping behavior of such a vibration damper, the valve arrangement preferably has a pilot valve which acts as a pressure regulator. The damper device or the vibration damper usually has two fluid chambers between which damping fluid is exchanged. The fluid chambers are a first chamber (or pressure stage chamber) and a second chamber (or rebound chamber). Damping fluid flows from the pressure stage chamber towards the second chamber or rebound chamber during the compression of the damper device. During the spring decompression process or rebound, damping fluid flows from the rebound chamber towards the pressure stage chamber, wherein the damping fluid flows through the valve arrangement, which helps in performing damping work and in dampening the vibration amplitudes acting on the damping device. The pilot valve can be used to influence the opening behavior of the valve assembly or pre-controlled valve by building up a control pressure in a pre-control chamber which pressure acts on the valve piston of the main valve or a valve assembly arranged on the valve piston. The damper force changes with the speed of movement of the piston rod on which the valve piston is arranged.

When a vehicle provided with a vibration damper having a pre-controlled valve drives over a bump in the road, this causes the piston rod to move at a certain speed. If this speed increases, for example, depending on the amount of force applied to the piston rod, this leads to a higher damper force and the main valve located on the valve piston then opens suddenly or abruptly and there is a sharp bend in the diagram of the damper force plotted against the piston rod speed or damper speed. This sharp bend in the force characteristic curve plotted against the damper speed is noticeable when driving the vehicle in the form of a loss of comfort, which is often observed with a vibration damper equipped with a pre-controlled valve.

Accordingly, a valve arrangement for a vibration damper is provided. The apparatus has a valve housing having an annular valve seat and adapted for receiving damping fluid, and having a valve piston which is arranged in an axially displaceable manner relative to the valve seat in an inner space of the valve housing. The valve piston includes a main valve which has a flexible circular valve contact disc, which can be brought detachably into contact with a contact surface side on the valve seat; the valve contact disc is arranged on the valve piston by means of a guide pin such that it can be moved axially relative to the latter and is guided radially. The valve arrangement preferably includes an electromagnet having an armature for acting on a pilot valve; a flexible support disc is arranged on the bearing surface side of the valve contact disc facing away from the contact surface side of the valve disc, on which support disc the valve contact disc rests along a partial peripheral region extending in the peripheral direction of the valve contact disc.

The support disc thus rests on the valve contact disc and supports it when pressure or force is applied to the valve contact disc in the direction of the support disc. However, because the valve contact disc only rests on the support disc along a partial peripheral region extending in the peripheral direction of the valve contact disc, the valve contact disc has partial regions or segments, or surface areas, when viewed in the peripheral direction, in which the support disc cannot support the valve contact disc in the opposite direction to the force acting on the valve contact disc when pressure is applied to the valve contact disc; that is, the support disc cannot absorb a force supporting the valve contact disc in such regions, i.e., it cannot build up an abutment force. This can lead to the valve contact disc bending or deforming in the regions not supported by the support disc.

In the above-mentioned partial regions or segments or surface areas of the valve contact disc, where the latter does not rest on the support disc, the application of a damping pressure to the valve contact disc via the damping fluid causes the valve contact disc in the region of the partial regions or segments or surface areas to deform or bend as a result of the force applied by the damping pressure. Consequently, the valve contact disc may lose contact with the annular valve seat, against which the valve contact disc rests flat in the unloaded state, due to the application of force to the deformed partial regions or segments or surface areas. As a result of the valve contact disc lifting off the valve seat in some regions, a gap is created between the deformed regions of the valve contact disc and the valve seat, and damping fluid can pass through the gap and thus damping work is performed.

In the case of pre-controlled valves known in the art, the valve disc of the main valve rests on the annular valve seat over its entire surface until the main piston or valve piston executes a slight movement in the direction of force of the pressurization as a result of the pressurization of the valve disc or the main piston. This leads to a jerky or abrupt lifting movement of the valve disc from the valve seat and, due to the mass inertia of the main piston, results in a movement of the main piston (together with the valve disc) in the direction of force, by a distance that is greater than the distance corresponding to the resulting force difference between the pressure force acting on the valve disc and/or the main piston and the counterforce resulting from the pressure in the pre-control chamber of the pilot valve. An overshoot thus takes place. Due to this overshooting movement of the main piston in the direction of the pre-control chamber of the pilot valve, the pressure in the pre-control chamber increases correspondingly, which induces a countermovement of the main piston with the main valve, such that a time-dependent oscillating vibration course occurs in the system pressure course, plotted over time. This causes the loss of comfort mentioned previously.

The present system or apparatus remedies the foregoing problem. It does so by influencing the opening behavior of the main valve in such a way that, already at a point in time before a force equilibrium between the pressure force acting on the main valve and the counterforce due to the pilot pressure and any additional spring force components is established—at such a point in time the main valve would open by lifting itself off the valve seat—the main valve begins to open. When the main valve begins to open, a volume flow of damping fluid beings to flow through the main valve. This volumetric flow is due to the lifting movement, in certain regions or sections, of the valve contact disc from the valve seat in the region of the surfaces of the valve contact disc that are not supported by the support disc. A jerky or abrupt opening of the main valve is thus avoided, the oscillating vibration course in the system pressure described above is avoided, and the described loss of comfort is also avoided.

According to one aspect of the invention, the support disc has at least one clearance in the peripheral direction, at which the valve contact disc (sometimes hereinafter "valve disc") is free from support by the support disc; the valve disc deflects more strongly in the region of the clearance than in the region of the support disc without clearance when pressure is applied in the direction of the support disc. With the at least one clearance of the support disc in its peripheral direction, it is achieved that, in the event of pressurization by the system pressure occurring in the valve arrangement or in the pressure stage chamber or in the rebound chamber, no supporting force is established between the support disc and the valve disc in the region of the clearance (and slightly adjacent thereto). Thus, the valve contact disc can bend or flex or deform relative to the support disc as a result of the pressurization, and a gap opens between the valve contact disc and the valve seat, through which pressure can be released and damping fluid can flow. Efficient damping work accordingly can be performed.

The clearance can therefore be a region, or surface area or section, or segment of the support disc where the support disc does not abut on the valve disc; the valve disc thus can bend, deform, or flex relative to the support disc, whereby a gap is created between the valve disc and a section, surface area, or segment of a sealing surface against which the valve disc abuts (or with which it can be brought into contact). The sealing surface can be the aforementioned annular valve seat, or another sealing surface that is created between the valve disc and another component.

The valve disc can therefore provide a flow of damping fluid in the region of the clearance even before the forces acting on the main piston lead to a displacement movement of the main piston, which forces cause a complete opening of the main valve on the main piston. When the forces acting on the main piston thereafter lead to a displacement movement of the main piston, and thus to an opening movement of the main valve provided on the main piston, a flow of damping fluid already takes place in the region between the valve disc of the main valve and the valve seat immediately before the main valve is lifted off the valve seat; accordingly, the flow of damping fluid does not start immediately when the main valve is lifted off the valve seat. In this manner, the "overshooting" movement of the main piston described previously above is avoided.

According to another aspect of the invention, the support disc has a first region which is circular in a plan view and has a first diameter which is smaller than the outer diameter of the valve disc and, starting from the outer periphery of the first region, at least one second region which has a second diameter or a second extension extends radially outwards and extends along a partial region of the periphery of the support disc in the peripheral direction of the support disc. Thus, in a plan view, the support disc has a circular first region. Starting from this first region, at least a second region extends outwards, which has an outer dimension at the outer edge viewed from the centre of the support disc, which is larger than the diameter of the first region.

Although a support disc having a circular first region has been mentioned above, this support disc may also have an outer configuration that deviates from the circular shape, e.g., rectangular, polygonal, oval, ellipsoidal or similar. From the outer peripheral region of the first region, a second region or a second extension extends outwards, the outer edge of which is at a greater distance from the middle or center of the support disc (as seen from the middle or the centre of the support disc). This second region then has a smaller extension in the outer peripheral direction of the first region than the outer peripheral region of the first region. The second region can be, for example, a region extending away from the first region in the form of a wing or tab. More than one such second region may be provided on the outer peripheral region of the first region, for example two such second regions which, when viewed from the middle or the center of the support disc, are opposite one another or are also offset at an angle to one another.

According to still another aspect of the invention, the support disc has at least two radially outwardly extending projections which are opposite each other and which, when viewed from the center of the support disc, have a radial extension which is smaller than or equal to the outer diameter of the valve disc. With such a configuration, an advantage is obtained that the valve disc resting on the support disc in the region of the first region of the support disc is supported by the first region when a force is applied by a damping fluid in the direction of the support disc, and also those regions of the valve disc which rest on the projections of the support disc are supported by the support disc. Those regions of the valve disc which lie outside the first region of the support disc, and also do not rest on the projections of the support disc, are largely free to deform or deflect when a force is applied by damping fluid. These deforming or bending regions of the valve disc then also no longer lie against a sealing surface against which the non-bending regions of the valve disc still lie. In this manner, the valve disc only lifts from the sealing surface along a partial region of its outer circumference, and a volume flow of damping fluid takes place along the regions that lift from the sealing surface. The valve disc thus assumes a configuration similar to a curved spring washer.

According to another aspect of the invention, the valve arrangement has at least one bearing disc on which the support disc rests with its side facing away from the valve disc. This bearing disc is more rigid that the valve disc and/or the support disc, such that the support disc is supported by the bearing disc when pressure is applied to the valve disc in the direction of the support disc. The bearing disc thus absorbs the compressive force which acts on the valve disc (and thus on the support disc) when the valve disc is pressurized with damping pressure in the direction of the support disc. The support disc also prevents overloading of the valve disc and/or the support disc, since the regions of the valve disc not supported by the support disc can only bend or deform in the direction of the bearing disc when pressure is applied until the bent or deformed regions of the valve disc come into contact with the rigid bearing disc.

The valve disc is designed to be flexible, such that it can deform slightly in the region of the clearance(s) of the support disc, when the damping pressure increases and can open up a gap or gaps for damping fluid to pass through. Depending on the speed of movement of the piston rod, the damping pressure acting on the valve disc can have high values, which could lead to a possible overload of the flexible valve disc. However, because the valve disc is supported by the support disc on the bearing disc, more than one bearing disc can be provided to support the support disc and thus the valve disc, and it thus is achieved that the valve disc is not deformed exceeding the predetermined degree when the damping pressure takes on high values. In addition, this configuration also prevents any damage to the flexible valve disc due to high damping pressure.

According to another aspect of the invention, the valve arrangement has a tubular sleeve body which defines a slot along a partial region of its longitudinal extension forming the wall of the sleeve body with opposing recesses; cylindrical tube segments are formed adjacent to the recesses and extending away from a base of the sleeve body and running in the longitudinal direction of the sleeve body. The sleeve body thus has a tubular configuration with a base on a front-side end region of the cylindrically formed tube section. Starting from the region of the base or at a distance from the base, the cylindrical tube section body has two recesses opposite each other which, in a plan view, are formed as rectangular recesses which break through the wall of the tube section body opposite each other on both sides; starting from the base or at a distance from the base, they extend to the opposite front-side end region of the tube section body. In this manner, two elongated tube segments are generated, which can be arranged opposite each other and whereby the two recesses are arranged at a distance apart from each other.

According to an aspect of the invention, the valve disc and/or the support disc is provided with two recesses within the outer periphery, between which a central web is formed, wherein the recesses are penetrated by the tube segments. This configuration ensures that the valve disc defining the two recesses can be placed on the sleeve body such that the central web passes through the two recesses of the sleeve body, and the valve disc and/or the support disc is guided in an anti-rotation manner via physical contact between the two tube segments and inner peripheral regions of the recesses. In addition, the discs are guided radially by the guide pin. This radial guidance ensures that the valve disc and/or the support disc does not tilt relative to the guide pin and/or sleeve body when pressurized by damping pressure (both via the contact surface side and via the bearing surface side), but is arranged on the latter in an axially moveably guided manner—yet is radially guided and does not assume an inclined position relative to a longitudinal axis of the sleeve body that leads to tilting. In a similar manner, this radially inner guide provides that the support disc and/or the bearing disc does not tilt relative to the longitudinal axis of the sleeve body when the corresponding pressure is applied. Consequently, both the valve disc and the support disc, as well as the bearing disc, are radially guided on the sleeve body and can neither cant nor tilt relative to the longitudinal axis of the sleeve body. The risk of the valve disc and/or the support disc being titled relative to the longitudinal axis of the sleeve body when pressure is applied thereby is avoided.

According to yet another aspect of the invention, the pilot valve has a sealing body provided with an outer cone which can be brought into contact with an annular valve seat of a drain valve by means of a spring. The sealing body thus can be brought into contact with the annular valve seat of the drain valve in an unpowered position of the electromagnet. For this purpose, a disc spring is provided which presses the sealing body onto the annular valve seat. If the electromagnet is energized, the valve body can be brought into a position opening the drain valve against the action of the disc spring, such that a fluid flow of damping fluid from the pre-control chamber via the drain valve is made possible.

Still another aspect of the invention is that the pilot valve comprises a valve disc which, in the de-energized state of the electromagnet, allows a fluid flow from a pre-control chamber of the pilot valve via the valve housing. By this configuration, if the electromagnet of the pilot valve is in a de-energized position, a safety position of the pilot valve can be effected. The sealing body then lies with its outer cone against the annular valve seat of the drain valve of the pilot valve, such that the drain of damping fluid via the drain valve is prevented. In such a position, the damping fluid is then guided in the direction of a valve disc resting against a valve seat, i.e., an emergency valve disc, which is opened by the system pressure of the damping fluid; the damping fluid thereby can drain off and no system pressure exceeding the predetermined opening pressure of the emergency valve disc can occur. With this configuration, an emergency running position of the pilot valve and thus of the valve arrangement can thus be achieved.

According to another aspect of the invention, the valve disc has an inner recess which has a larger diameter than the support disc arranged below it in the vertical axis direction of the valve arrangement, and the edge region of the inner recess lifts away from the support disc when pressurized with damping fluid in the direction out of the inner space of the valve housing. This configuration obtains the advantage that in the event of a pressure increase in the valve housing during a decompression movement or rebound movement of the vibration damper provided with the valve arrangement according to the invention, a first small volume flow of damping fluid can flow out of the rebound chamber in the direction of the pressure stage chamber already at a low speed of the piston rod; thus damping work is already performed at a low speed of the piston rod, namely at a time when the pressure in the pressure stage chamber is still too low to cause a displacement movement of the main piston and the main valve of the valve arrangement coupled thereto. Accordingly, the problem outlined hereinabove of "overshooting" with subsequent oscillating movement of the main valve or the main piston can also be prevented in the case of a decompression movement or rebound movement.

In yet another aspect of the invention, the valve disc has an edge region arranged on the outer diameter, which lifts off from the valve seat in the direction of the inner space when pressurized with damping fluid in the direction of the inner space. At a low piston rod speed, this lifting movement of the valve disc from the valve seat causes damping work to be performed well before the time at which the valve disc lifts completely from the valve seat due to a high piston rod speed.

The present system and apparatus also supplies a vibration damper having a tube and a piston rod. The tube has an inner space formed to receive the damping fluid, and the vibration damper has a valve arrangement as explained above, and the vibration damper has a pressure stage chamber and a rebound chamber, wherein the two chambers have a respective inner space which is physically separated from the valve arrangement. The valve arrangement according to the invention thus physically separates the two chambers, but both chambers are fluidically connected so as to be in fluid communication with each other via the valve arrangement, that is, designed for fluid exchange via the valve arrangement.

The invention also may include a vehicle having at least one front wheel and at least one rear wheel, wherein the vehicle has a vibration damper as described above.

Figure 14:
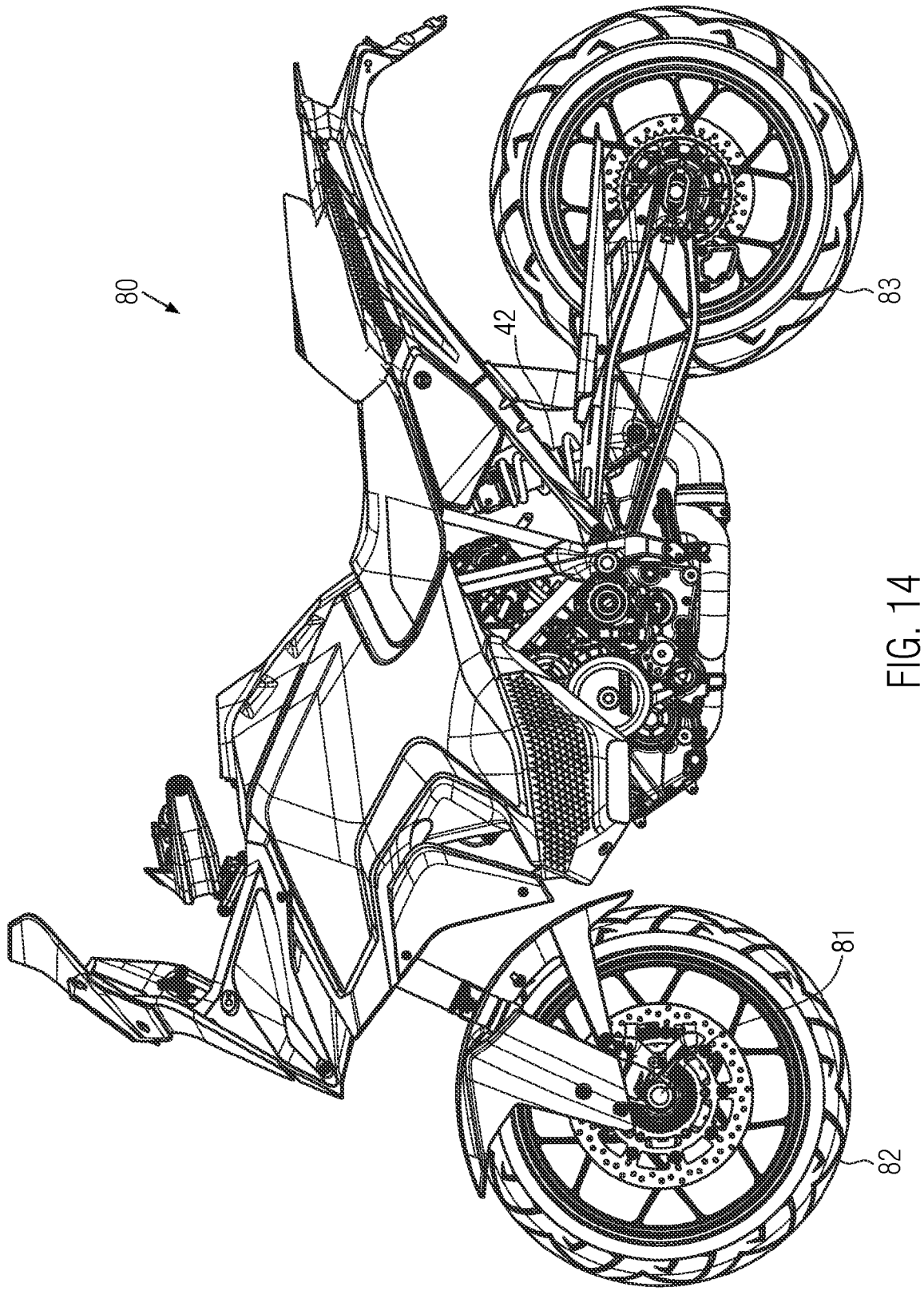
FIG. 14 a side view of a motorbike having a valve arrangement according to the present disclosure.

Attention is invited to FIG. 1 which shows a sectional depiction of a telescopic suspension fork leg 40 of a motorbike 80 according to an embodiment of the valve arrangement 1. The telescopic suspension fork leg 40 has an axle clamp 41 at the lower end, as seen in FIG. 1, for receiving a full-floating axle 81 of the front wheel 82 of the motorbike 80 depicted in FIG. 14 of the drawing. The telescopic suspension fork leg 40 is a telescopic suspension fork leg designed in upside-down configuration, in which the pressure stage chamber PD is arranged below the valve arrangement 1 in the vertical axis direction H of the telescopic suspension fork leg 40, while the rebound chamber PZ is arranged above the valve arrangement 1. The valve arrangement 1 can also be used in a telescopic fork leg (not depicted in more detail), in which the pressure stage chamber PD is arranged above the valve arrangement in the vertical axis direction H and the rebound chamber PZ is arranged below the valve arrangement 1. FIG. 1 of the drawing also shows a section II, which is depicted in more detail in FIG. 2 of the drawing.

Figure 2:
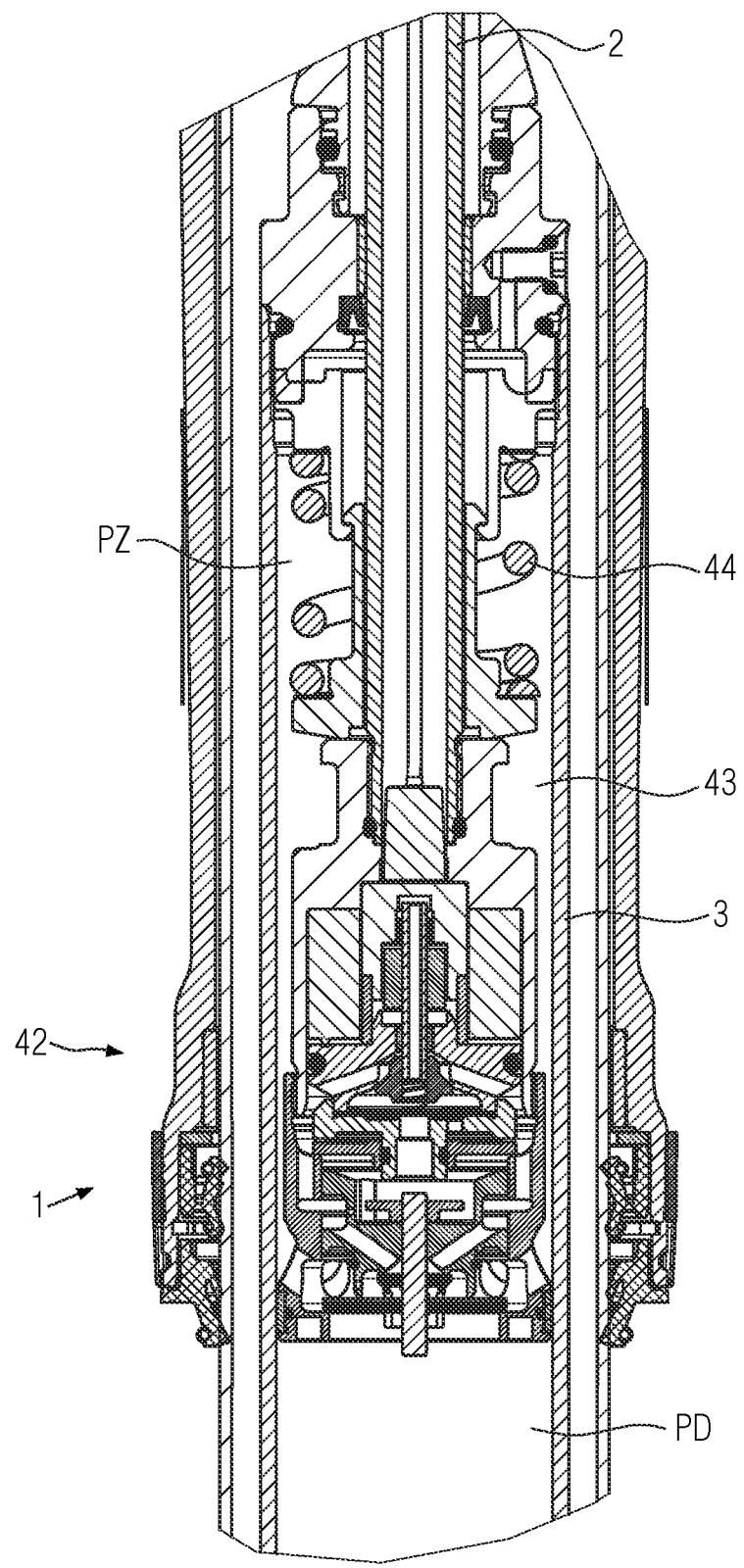
FIG. 2 is an enlarged view of section "II" according to FIG. 1.

The valve arrangement 1 can therefore be used, for example, on a vibration damper 42 formed as a telescopic suspension fork leg 40, as depicted in more detail in FIG. 2. The vibration damper 42 has a tube 3 and a piston rod 2, which are arranged in an inner space 43 of the tube 3 together with the valve arrangement 1. The inner space 43 is designed to receive a damping fluid not depicted in more detail, which in a preferred embodiment is conventional fork oil. As can be seen from FIG. 2, the rebound chamber PZ and the pressure stage chamber PD are physically separated from the valve arrangement 1, but are fluidically connected (i.e., in fluid communication) via the valve arrangement 1 for the exchange of fork oil, that is, for the fluid exchange of damping fluid. The valve arrangement 1 is supported by a spring 44 on an abutment 45, which can be seen in FIGS. 1 and 2.

In the following, FIG. 3 of the drawing will be discussed in more detail, which shows the valve arrangement 1 and further components in a position rotated by 180 degrees compared to the installation position of the valve arrangement 1 in the telescopic suspension fork leg 40 for ease of depiction and explanation.

Figure 4:
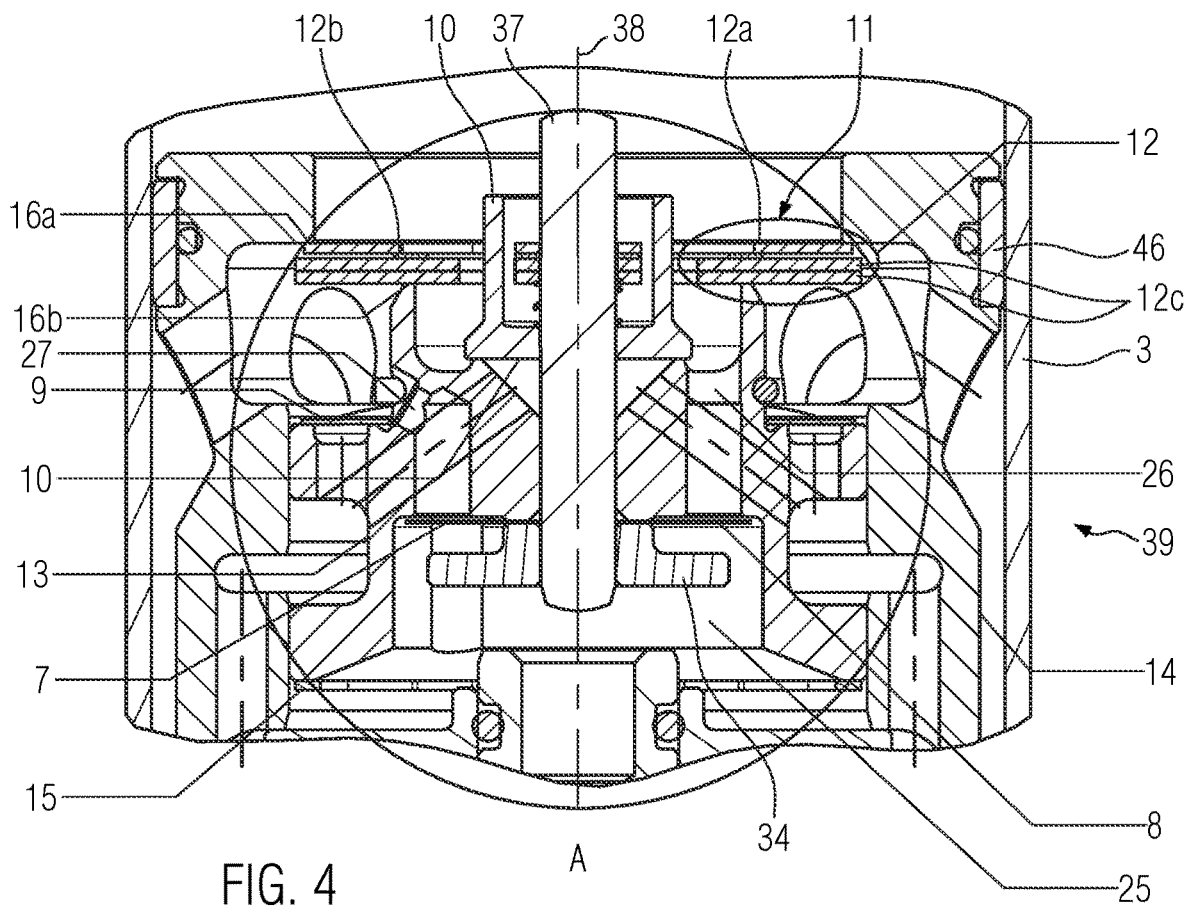
FIG. 4 is an enlarged view of section "A" according to FIG. 3.
Figure 5:
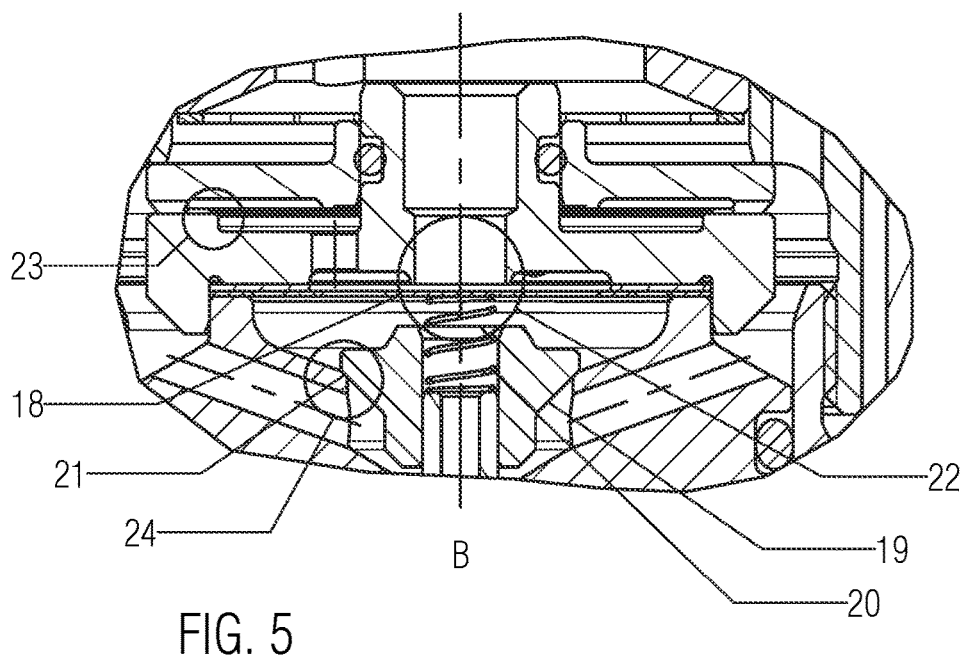
FIG. 5 is an enlarged view of section "B" according to FIG. 3.

Details A and B, which are shown in more detail in FIGS. 4 and 5 of the drawing, are also discussed, wherein detail A shows elements of the valve arrangement 1 and detail B shows elements of the pilot valve B provided on the valve arrangement 1. The valve arrangement 1 has an annular valve seat 16a and has a valve housing 14 which is designed to receive damping fluid in the form of the fork oil mentioned above. In addition, the valve arrangement 1 has a valve piston 13, on which a main valve 11 having three valve discs 12 is arranged, which comprises the valve contact disc 12a, support disc 12b, and a bearing disc 12c shown in FIG. 13. The bearing disc 12c is supported on an annular valve seat 16b, which is arranged on an upper side of the valve piston 13. The valve arrangement 1 has a passage 27 which acts as a restrictor of the rebound stage and also has a passage 26 which acts as a restrictor of the pressure stage.

Figure 13:
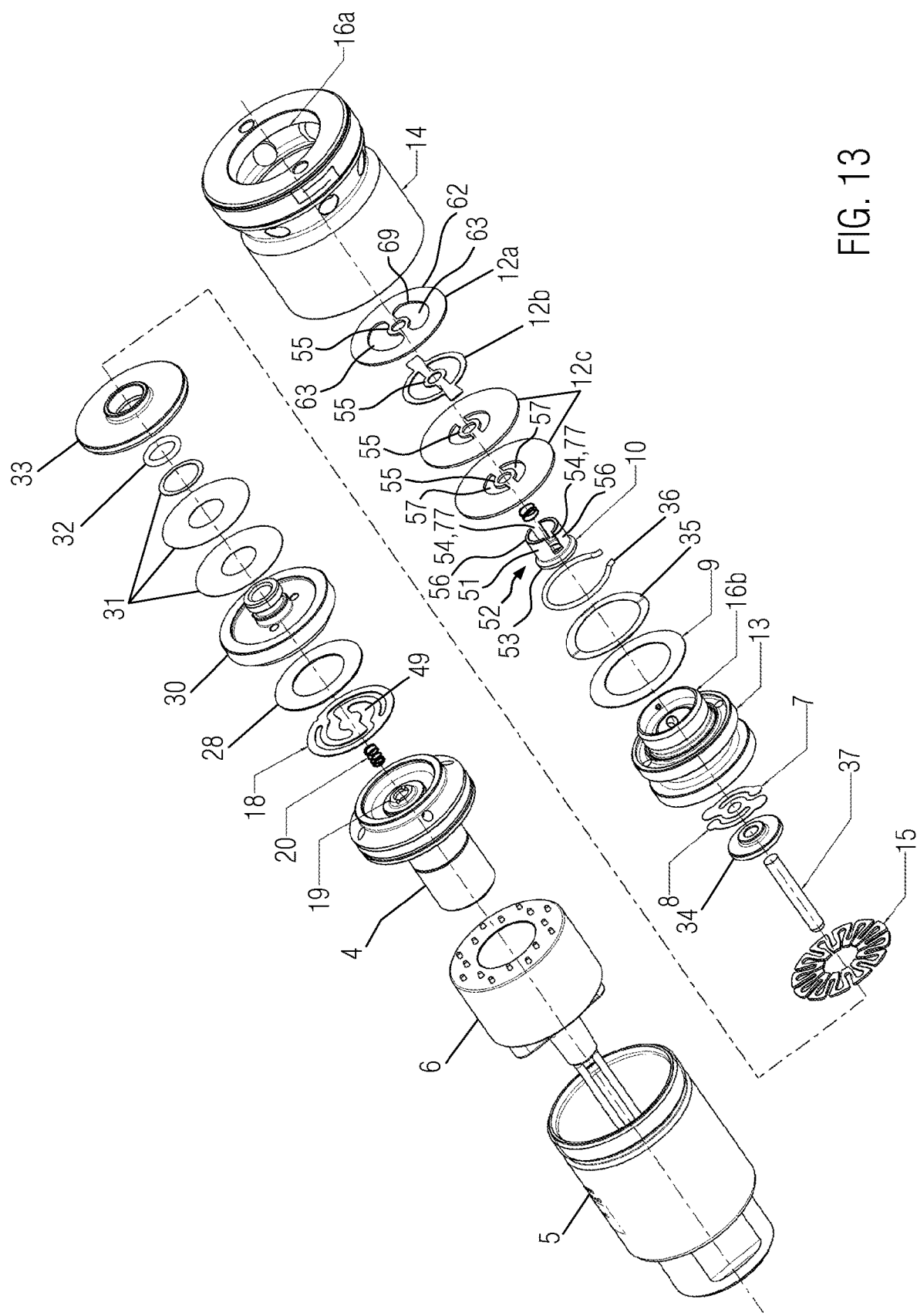
FIG. 13 is an exploded view of a valve arrangement according to one embodiment of the present invention.

The valve discs 12 are arranged on a guide pin 37 and are axially moveable and radially guided relative to the valve piston 13, wherein for this purpose, a sleeve body 10, which can be seen in more detail in FIG. 13 of the drawing, is provided. The valve discs 12 are radially guided on the sleeve body 10 such that they cannot tilt relative to the longitudinal axis 38 of the guide pin 37 and thus relative to the longitudinal axis 38 of the valve arrangement 1. The valve arrangement 1 also has several check valves 7, 8, 9, 10, which will be discussed below, wherein it is already mentioned at this point that the sleeve body 10 also acts as a check valve. The valve arrangement 1 also has a spring washer 15, which is of meandering design, as can be seen from the depiction in FIG. 13.

The valve piston 13 is arranged in an axially displaceable manner in an inner space 39 of the valve housing 14. A pre-control chamber 25 is also formed in the inner space 39, in which a pre-control pressure or pilot pressure can be formed. The guide pin 37 is arranged on a stop disc 34 and also receives the slotted sleeve body 10, on which the valve discs 12 are radially guided and axially received in a displaceable manner. The valve housing 14 is received in the tube 3 of the vibration damper 42 in a radially supported sealing manner via a sealing device 46.

FIG. 5 shows the pilot valve B having a sealing body 19 which, in the depicted embodiment, is sectionally frusto-conical and has an outer cone 47 Which is pressed by a spring 20 against an annular valve seat 21 of a drain valve 24.

Figure 3:
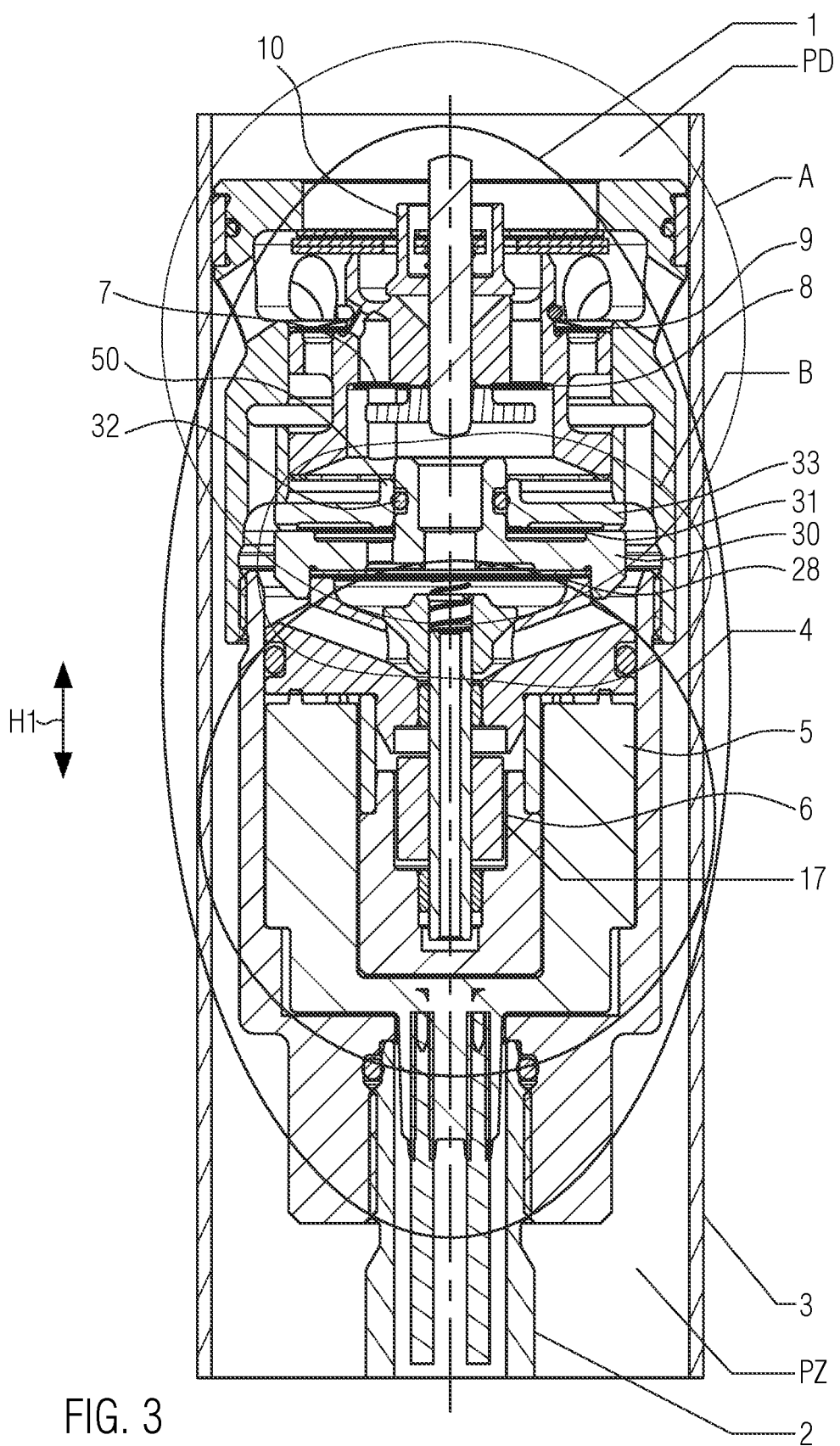
FIG. 3 a cross-sectional view of a portion of the valve arrangement according to the embodiment seen FIG. 1.
Figure 12:
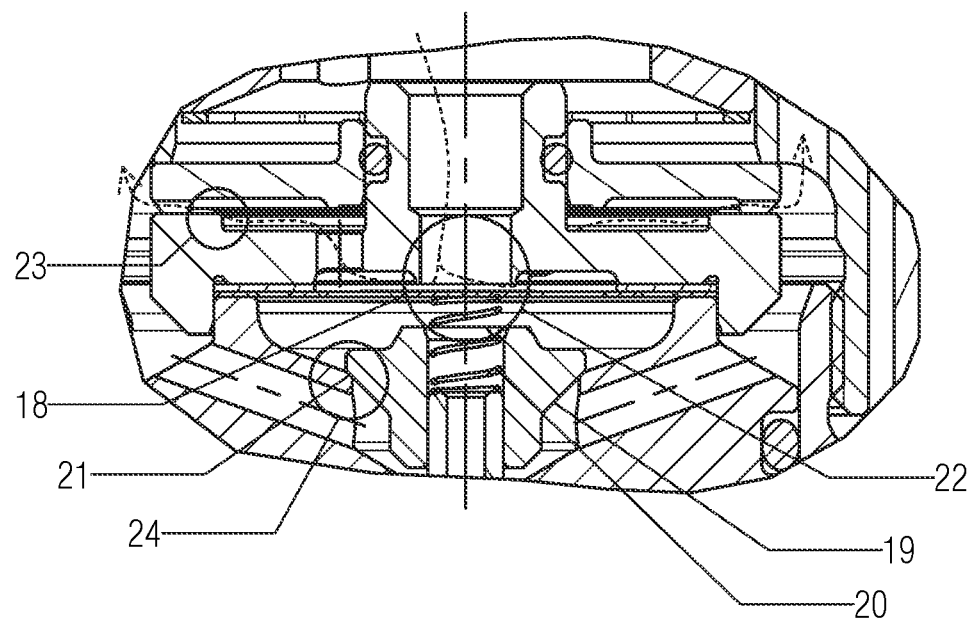
FIG. 12 is an enlarged view of a portion of the pilot valve, illustrating its emergency function.

FIG. 3 of the drawing shows that the pilot valve B has an electromagnet 4, the armature 17 of which can be displaced in the vertical axis direction H1 by means of a current application, namely against the action of the valve spring 18. When the electromagnet 4 is in a de-energized position, which is depicted in FIG. 5 and FIG. 12, system pressure in the inner space 39 of the valve housing 14 cannot be released through the valve seat 21 or the drain valve 24. The pilot valve B has an operating valve 22, which can be seen in FIG. 8a, as a through opening between a supporting edge 48 of a valve seat 30 and the valve spring 18. When the pilot valve B is in the de-energized position, a fluid flow induced by the system pressure takes place via the operating valve 22. The system pressure, via the incompressible fork oil, causes a fluid flow as depicted with dashed lines in FIG. 12, since the emergency valve disc 23 can be opened by the system pressure and it can result in a predetermined pressure relief.

In a housing 5, which can be seen in more detail in FIG. 3 and FIG. 13, a coil 6 is arranged via which the armature 17 of the electromagnet 4 can be energized in such a way that the valve spring or valve disc 18 can be opened against its spring force. In this manner, with increasing energization, the operating valve 22 is continuously closed more against the action of the valve spring 18, and thereby produces a higher pressure drop. When the electromagnet 4 is energized from the de-energized position to a position supplied with a minimum current, the armature 17 generates a thrust force in the direction of the pilot valve B and opens the drain valve 24 against the action of the force of the spring 20, thereby short-circuiting the emergency valve formed by the emergency valve disc 23.

The valve spring 18 seen in FIG. 13 has a recess 49 which is provided for the passage of damping fluid (fork oil). The valve seat 30 mentioned above is arranged on the valve spring 18 with the interposition of a spacer disc 28. The cover disc 33 is arranged with the interposition of adjusting discs 31 and an O-ring 32, which cover disc is supported on a radially inner collar 50 on the spring washer 15.

Via check valves 7, 8, and the check valve 9, as well as the sleeve body 10, which also functions as a check valve, it is achieved that, irrespective of the direction of movement of the valve arrangement 1—i.e., regardless whether there is an inward or a rebound movement of the vibration damper 2—the pilot valve B is always supplied with damping fluid from the pressure-generating side, and the damping fluid can flow off to the side facing away from the pressure. A spring washer 35 depicted in FIG. 13 acts on the check valve 9 and is fixed by a snap ring 36.

Figure 9:
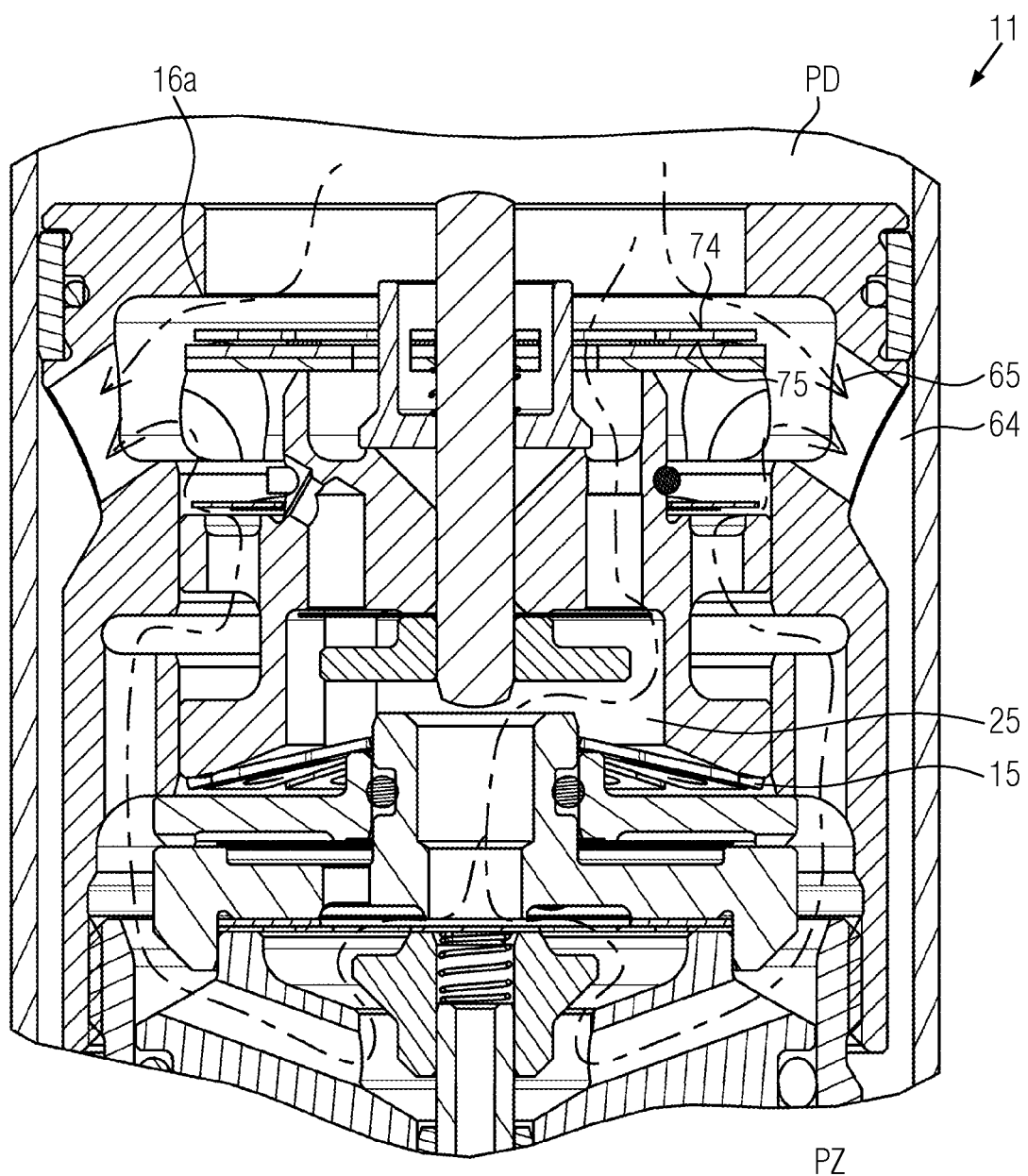
FIG. 9 is an enlarged sectional view of the valve arrangement, depicting the fluid flow in the pressure stage at a high speed of the piston rod.

The sleeve body 10 seen in FIG. 4 is depicted in the perspective view of FIG. 13. As is readily apparent from FIG. 13, the sleeve body 10 has a tubular configuration featuring a wall 51 formed by a hollow cylindrical body 52 which is arranged in a seated manner on a circular base 53 having an end face, and has opposing recesses 54 which, in a respective plan view, are rectangular and form a respective slot 77. The rectangular recesses 54 or slots 77 serve to receive a respective central web 55 of the valve contact disc 12a, the support disc 12b and the two bearing discs 12c (also depicted in FIG. 13). The respective central webs 55 are received in the recesses 54 and are supported on the base 53 of the sleeve body 10 via the spring 29. The valve contact disc 12a has a contact surface side 74, as can be seen, for example in FIG. 9, and a bearing surface side 75 opposite the contact surface side 74, which is also depicted in FIG. 9, wherein the valve contact disc 12a rests with the bearing surface side 75 on the support disc 12b arranged underneath it in certain regions.

The support disc 12b cannot support the valve contact disc 12a in the region of the clearances 76 of the support disc 12b. In the case of the support disc 12b depicted in FIGS. 6 and 7, the clearances 76 are the regions depicted with dot-dashed hatched lines, i.e., the regions where the support disc 12b does not support the valve contact disc 12a. On both sides of the recesses 54, the wall 51 is in the form of two cylindrical tubular segments extending away from the base 53 at right angles to it. The two bearing discs 12c are to be rigid and have two recesses 57, which are provided for receiving the tube segments 56 of the sleeve body 10. In addition, damping fluid can also flow through the two recesses 57.

Figure 6:
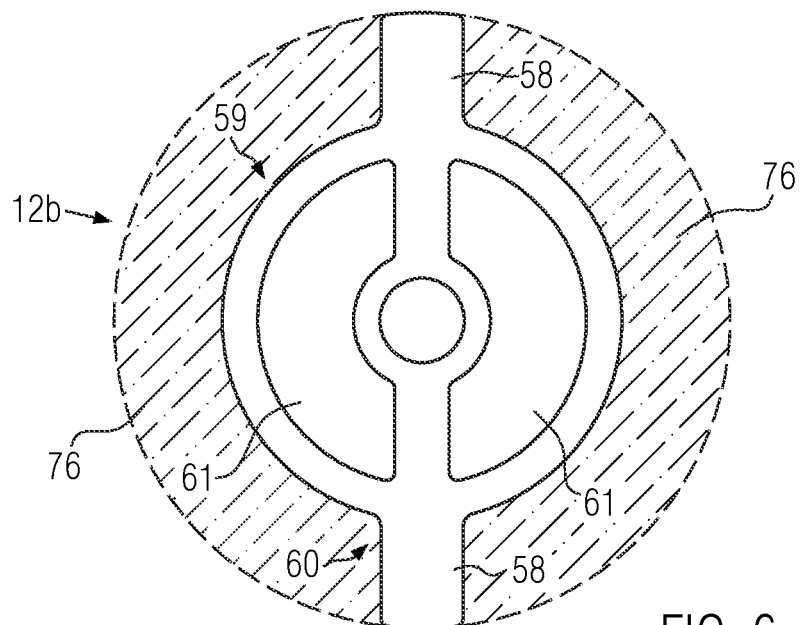
FIG. 6 is a plan view of a support disc of the valve arrangement according to a first embodiment.
Figure 7:
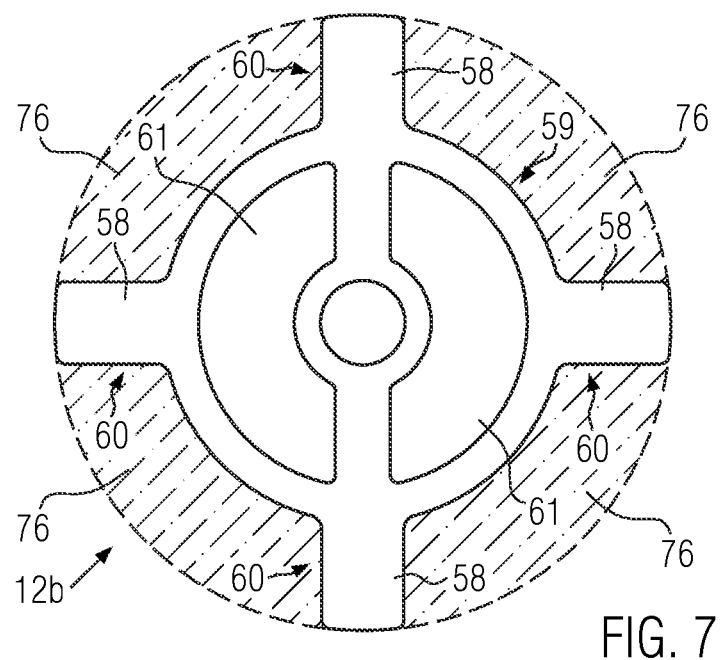
FIG. 7 is a plan view of a support disc of the valve arrangement according to a second embodiment.

The support disc 12b depicted in FIG. 13 is shown enlarged on the basis of two embodiments in FIGS. 6 and 7.

FIG. 6 illustrates a first embodiment of the support disc 12b having two projections 58, while FIG. 7 shows a second embodiment of the support disc 12b having four projections 58. The support disc 12b depicted in a respective plan view has a first region 59 which is circular in plan view and, in the depiction according to FIG. 6, two second regions 60 which extend radially outwards from the outer periphery of the first region 59 and which, in the embodiment depicted, are in the form of projections or wings 58. Similarly, according to the second embodiment, the support disc 12b depicted in FIG. 7 has a first circular region 59, from which four second regions 60 extend away in a radially outward direction, each of which is in the form of projections or wings 58. The first region 59 of the support disc 12b in each case has a smaller outer diameter than the valve disc 12a arranged to abut against it. This can be seen, on one hand, in FIG. 13 and also, for example, in FIGS. 4 and 8-11 of the drawing. The support disc 12b also has recesses 61 through which the cylindrical tube segments 56 of the sleeve body 10 pass and which are also designed for the passage of damping fluid.

As can be readily seen from FIG. 13, the valve disc 12a has an edge region 62 at the outer peripheral region, which edge region is provided for abutment against the annular valve seat 16a of the valve housing 14. Edge region 62 can also be lifted from the seat to form gaps between the valve disc 12a and the valve seat 16a, and can also be completely separated from the valve seat 16a when the valve piston 13 is moved axially in the direction away from the valve seat 16a, as will be explained in more detail below.

Figure 8:
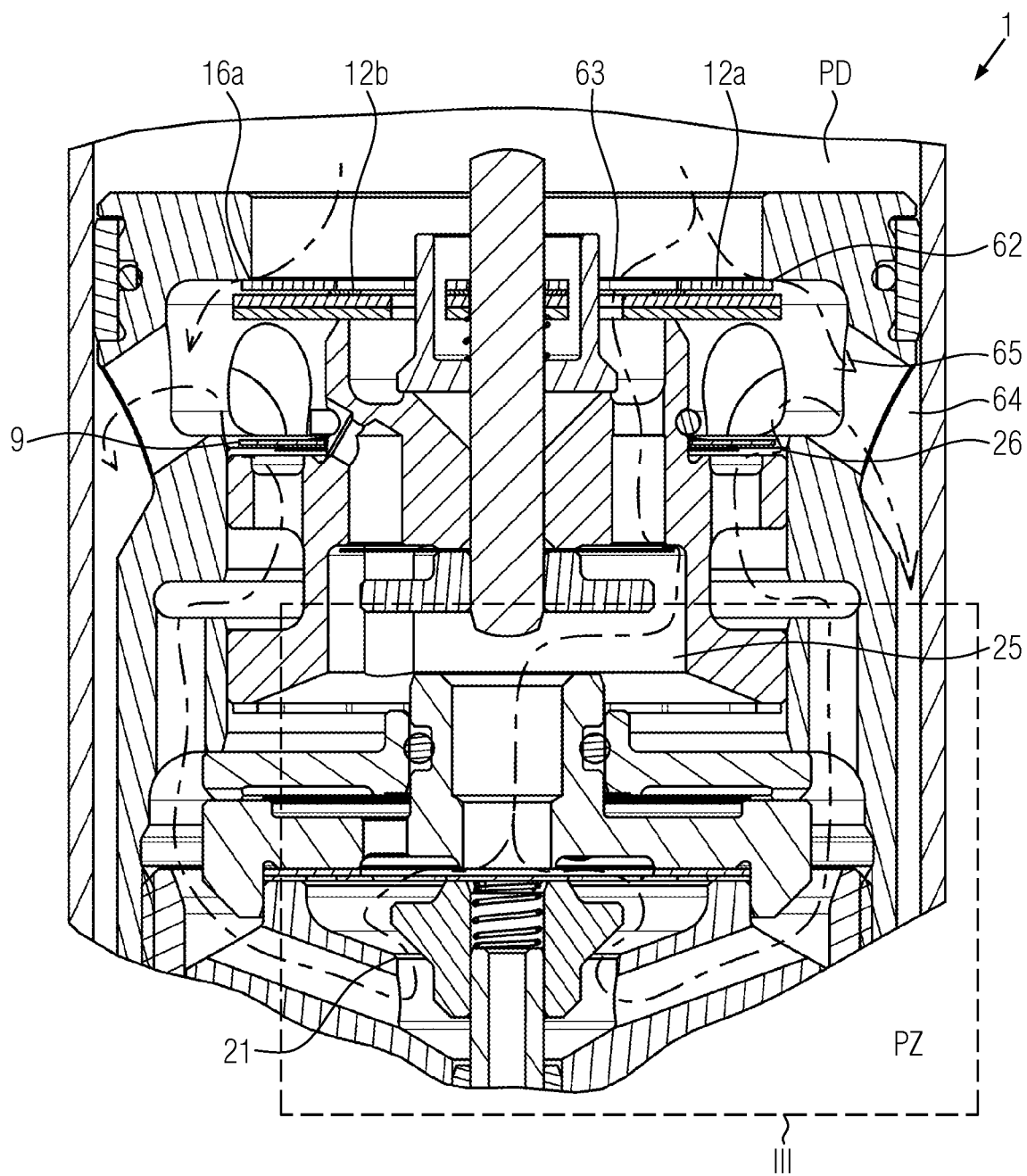
FIG. 8 is an enlarged sectional view of the valve arrangement, depicting the fluid flow in the pressure stage at a low speed of the piston rod.
Figure 8A:
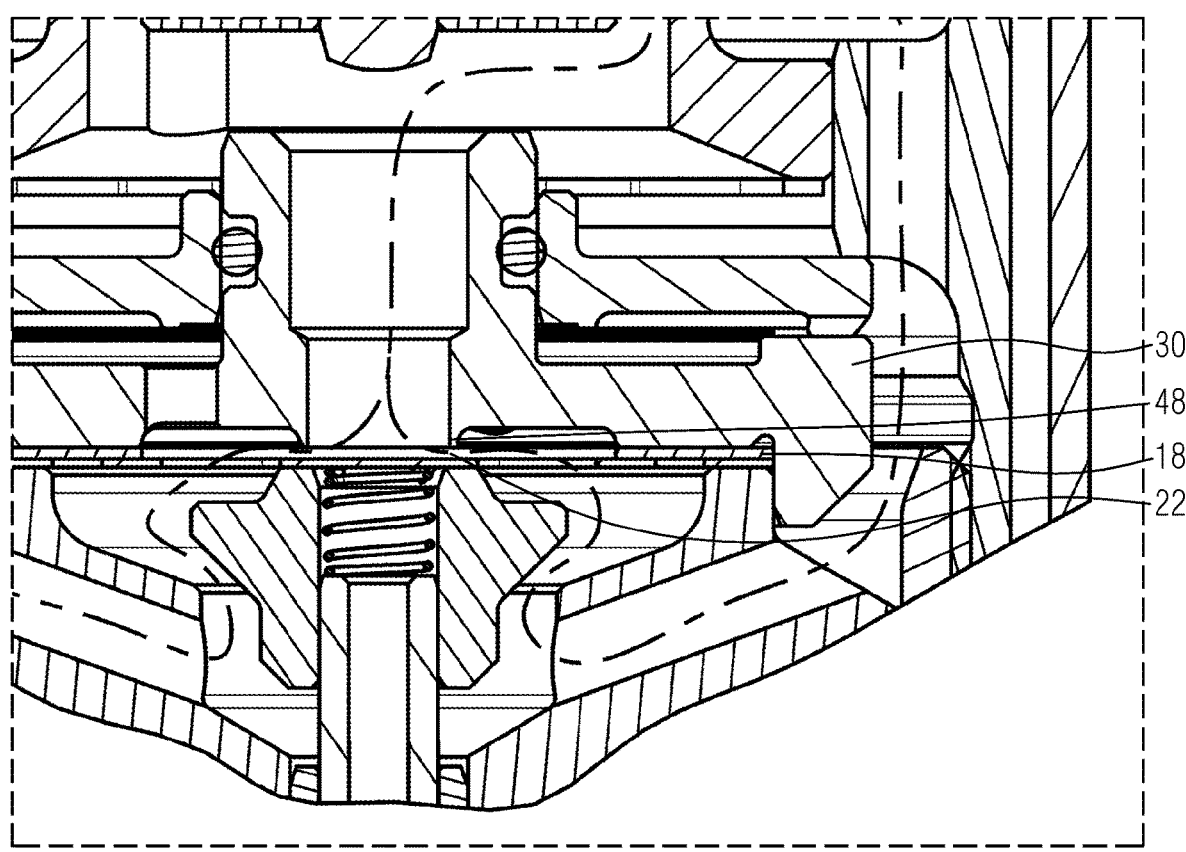
FIG. 8a is an enlarged depiction of section "III" according to FIG. 8.

FIG. 8 of the drawing shows an enlarged sectional view of the valve arrangement 1 to depict the fluid flow in the pressure stage at low speed of the piston rod 2. When the motorbike 80 provided with the valve arrangement 1 according to the invention drives over a bump in the road with the front wheel 82, this leads to a compression movement of the telescopic suspension fork leg 40. Depending on the height of the bump in the road and the speed at which the motorbike 80 drove over the hump, different piston rod speeds of the piston rod 2 can occur. The vibration damper 42 can also be used to dampen movements of the rear wheel 83 of the motorbike 80.

Figure 16:
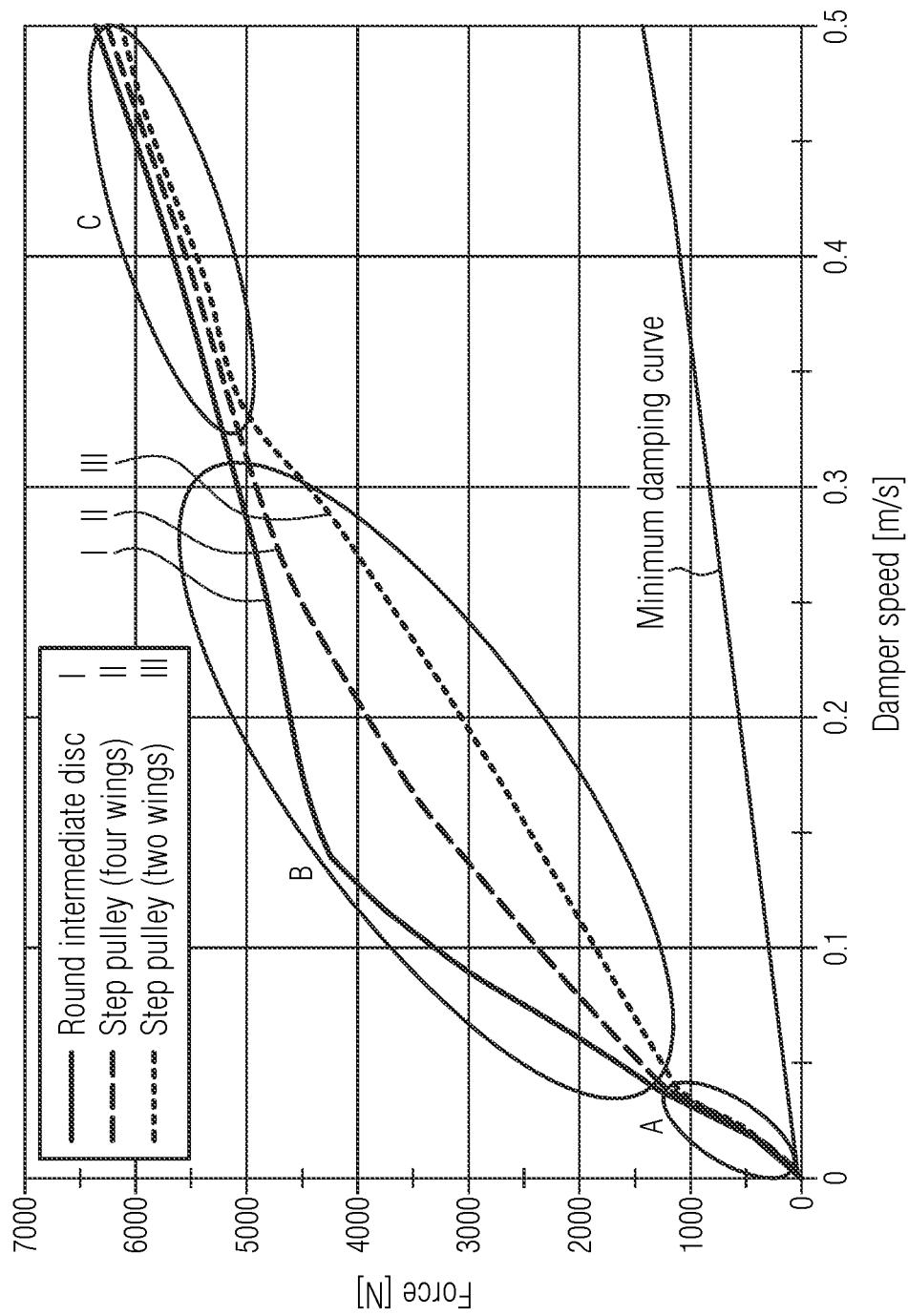
FIG. 16 a graph showing the damper force plotted against the speed of the piston rod.

The piston rod speed and the resulting damper force can be seen in the diagram according to FIG. 16, wherein these are qualitative indications. A classification of the speed of the piston rod 2 is possible as follows:
low speed in the range of from 0 to 0.05 m/s
average speed in the range of from 0.05 to 0.3 m/s
high speed in the range of from 0.3 to 1.5 m/s
The valve arrangement 1 attached to the piston rod 2 moves back and forth within the tube 3 filled with damping fluid in the form of, for example, fork oil.

The valve arrangement 1 (also comprising the electromagnet 4 described above and the valve arrangement 1 depicted, for example, in FIG. 4) has damping fluid flowing through it when it moves in both the compression direction and the tension direction. The movement in the compression direction occurs when the vibration damper 42, which for the sake of the explanation only, is formed as a telescopic suspension fork leg 40, experiences a compression movement, while the movement in the tension direction occurs when the vibration damper 42 experiences a decompression movement or a rebound movement. The term "pressure stage" corresponds to the state that occurs during the compression movement, while the moved rebound stage corresponds to the state that occurs during the deflection movement. With the aid of the electromagnet 4, the pressure drop can be influenced in both directions of movement by means of a corresponding displacement movement of the valve disc 18.

In each case, a part of the oil flow resulting from the respective movement is supplied to the pilot valve B, which is acted upon by the electromagnet 4. The system of four check valves 7, 8, 9, 10 described above makes it possible for the pilot valve B to always be supplied with damping fluid from the pressure-generating side, and for the damping fluid to flow off to the side facing away from the pressure. The pre-control pressure generated by the pilot valve B acts on the rear surface of the main valve 11 and thus influences the pressure drop occurring at the main valve 11 or the valve arrangement 1. The valve piston 13 is sealed against the valve housing 14 with a hydraulic fit and is thus radially guided and axially mounted. In addition, the valve piston 13 is pressed against the valve seat 16a in the valve housing 14 by means of the disc spring or spring washer 15.

If the electromagnet 4 is in the position without current from the coil 6, the pilot valve B assumes the safety position depicted in FIG. 12. Here, the outer cone 19 is in contact with the valve seat 21 of the drain valve 24 via the spring 20, and an oil flow which is established flows through the open operating valve 22 in the direction of the emergency valve formed by the emergency valve disc 23.

Energizing the electromagnet 4 with a minimum operating current ensures that the armature 17 of the electromagnet 4 exerts a thrust force in the direction of the pilot valve B; thus the drain valve 24 is opened against the force of the spring 20, and the emergency valve 23 is short-circuited. The operating valve 22 is still in a wide-open position, and in this way produces only a slight pressure drop. As the energization of the electromagnet 4 increases, the operating valve 22 is closed further and thus generates a higher pressure drop. During the compression process already described above, the piston rod 2 moves together with the valve arrangement 1 into the damper and thus in the direction of the pressure stage chamber PD.

FIG. 8 shows the flow of damping fluid at a low piston rod speed. The flow of damping fluid is shown by the arrows and the dashed lines. At low speeds of the piston rod 2, the main valve 11 remains closed and only a slight oil flow takes place via the main valve 11 by the recesses 63 of the valve contact disc 12a, the recesses 61 of the support disc 12b, and the recesses 57 of the bearing discs 12c being flowed through; the damping fluid passes the restrictor 26 and enters the pre-control chamber 25 and flows from there via the operating valve (FIG. 8a) and the open valve seat 21 and the check valve 9 (as well as the housing 14 in the direction of the rebound chamber PZ). This results in the course of the damper force over the piston rod speed or damper speed depicted in FIG. 16 of the drawing, which is marked with the segment "A" in the curve course.

In FIG. 16, the course of the damper force plotted against the damper speed is represented with "I" for a fictitious support disc which is designed with a full surface—that is, is not provided with projections or wings, in which the valve disc 12a would therefore rest along its entire contact surface. On the other hand, the course of the damper force marked "II" shows the course of the damper force when the support disc 12b is formed with four projections corresponding to the embodiment of FIG. 7, while the course of the damper force marked "III" shows the course of the damper force when the support disc 12b is formed with two projections 58 corresponding to the embodiment of FIG. 6. In the range of low piston rod speeds, the three courses I, II, III of the damper force plotted against the damper speed are largely the same.

However, a different picture emerges with the curve courses depicted in segment "B", which corresponds to the respective course of the damper force at average piston rod speeds. At average piston rod speeds, in addition to the course of the flow of the damping fluid described above, the further flow of damping fluid also depicted in FIG. 8 and designated as case arrow 65 occurs.

Figure 10:
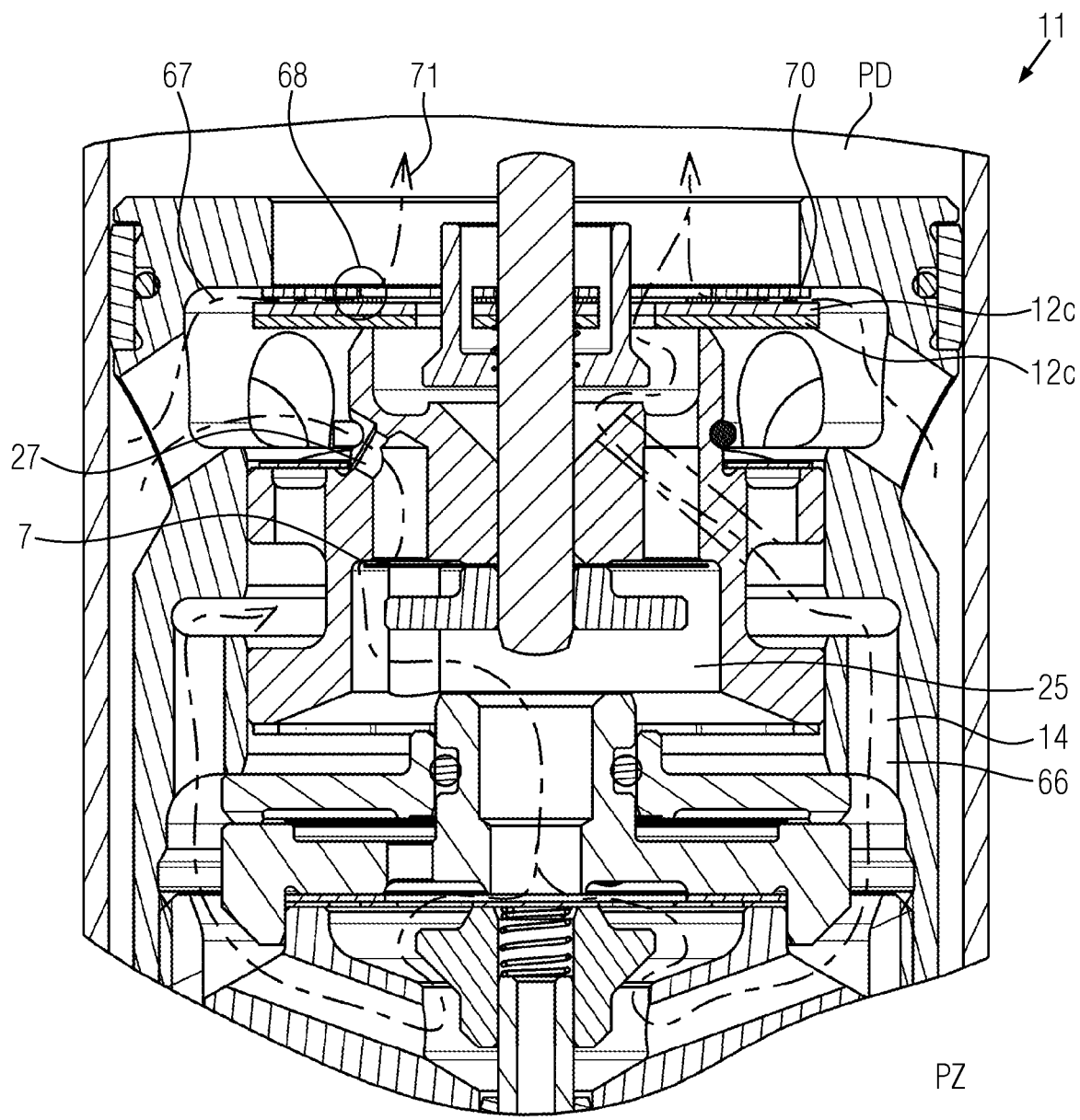
FIG. 10 is an enlarged sectional view of the valve arrangement, depicting the fluid flow in the rebound stage at a low speed of the piston rod.

Due to the pressure increase in the pressure stage chamber PD, part of the damping fluid still flows via the recesses 63 of the valve disc 12a, the recesses 61 of the support disc 12b, and the recesses 57 of the discs 12c, as described above. The recesses 63 of the valve disc 12a have, in the region of the mutually opposite curved outer peripheral regions, an inner recess 78 which has a larger diameter than the support disc 12b arranged below it (in the vertical axis direction of the valve arrangement 1), and the edge region 68 of the inner recess 78 lifts away from the support disc 12b when pressurized with damping fluid in the direction out of the inner space 39 of the valve housing 14, as depicted in FIG. 10 of the drawing. In addition, however, the pressure increase in the pressure stage chamber PD also ensures that the edge region 62 of the flexible valve disc 12a lifts away from the valve seat 16a to open a gap between the edge region 62 and the valve seat 16a.

Since the support disc 12b has a circular first region 59, which is smaller than the outer diameter of the valve disc 12a, and the valve disc 12a rests on the support disc 12b outside the first region 59 only at the projections 58, but these are not present along the entire peripheral extension of the circular first region 59, the valve disc 12a can deform relative to the support disc 12b at the regions not supported from below by the projections 58—similar to a spring washer—and in this way a gap is formed between the edge region 62 of the valve disc 12a and the annular valve seat 16a along a partial peripheral region of the valve disc 12a; an oil flow symbolised by the arrow 65 takes place directly via the channel 64 in the direction of the rebound chamber PZ.

By the configuration of the valve arrangement 1 as described herein as having the support disc 12b, which has radially outwardly projecting projections 58 which support the valve disc 12a on the support disc 12b on the bearing side of the valve disc 12a only in certain regions, it is achieved that the valve disc 12a can open a gap or gaps to the annular valve seat 16a at a time when other edge regions running in the peripheral direction of the edge region 62 of the valve disc 12a, namely those which are supported by or braced on the projections 58 of the support disc 12b, still abut on the valve seat 16a. By lifting off the edge region 62 of the valve disc 12a from the valve seat 16a in sections or regions, the advantage is obtained that a flow of damping fluid takes place through the occurring gap(s) between the edge region 62 and the valve seat 16a from the pressure stage chamber PD in the direction of the rebound chamber PZ; and this occurs before the valve disc 12a completely disengages from the annular valve seat 16a, and thus a sudden opening of the main valve 11 is avoided and the disadvantages of the known valve arrangement are eliminated.

As can be seen from the course "I" in segment "B" according to FIG. 16, in the case of a fictitious round support disc, i.e. a support disc without the projections 58 and the first region 59 with a smaller diameter, a bend in the curve course occurs at a piston rod speed of about 0.12 m/s. If a support disc 12*b* having four projections 58 is used instead of a full-surface round intermediate disc or support disc (which support disc 12*b* is depicted in FIG. 7), a curve course "II" of the damper force plotted against the damper speed occurs and the sharp bending of the damper force curve is already avoided. If a support disc 12*b* having two projections is used, as depicted in FIG. 6, the damper force course marked "III" occurs, and thus an almost linear course occurs across the entire speed range of the average piston rod speed.

Figure 15:
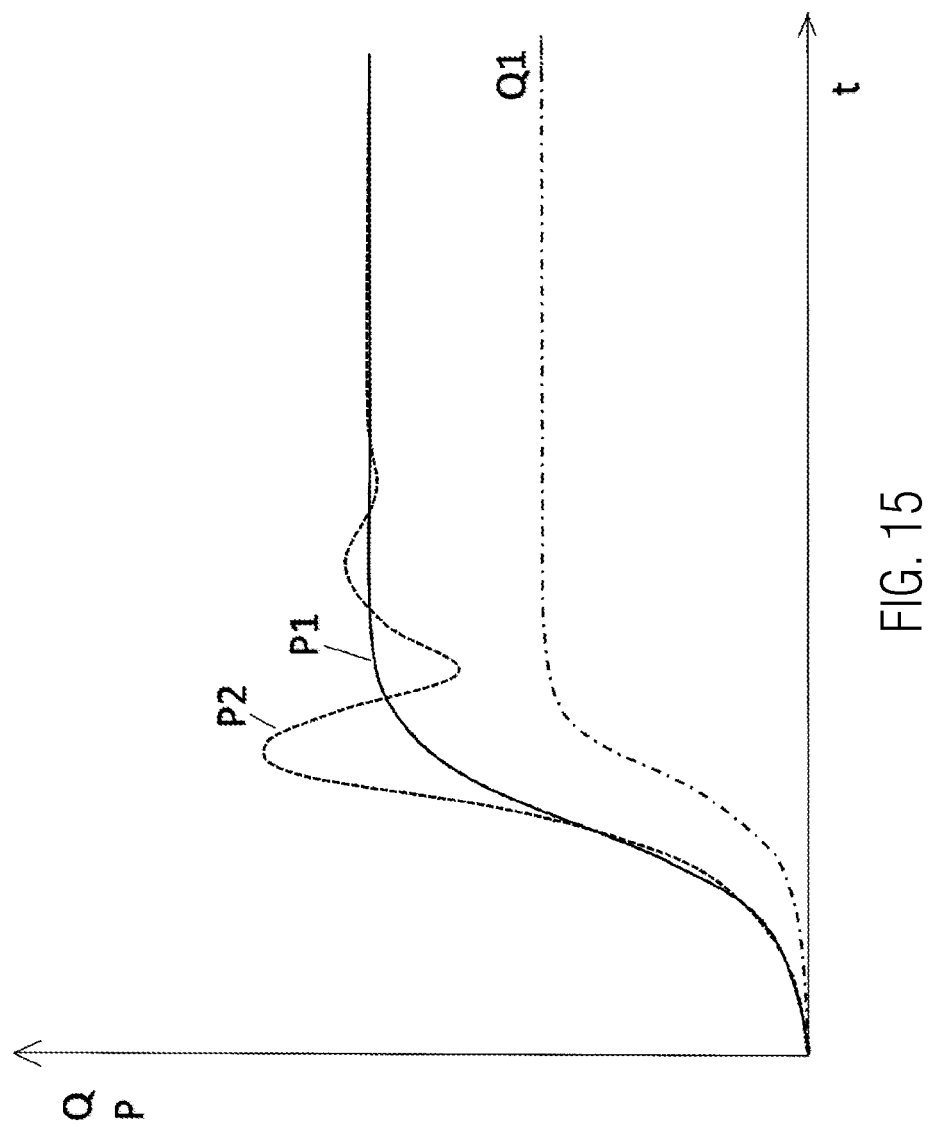
FIG. 15 a graph explaining the course of the volume flow of damping fluid, plotting the pressure course against time.

FIG. 15 shows a diagram explaining the course of the volume flow of damping fluid and the pressure course plotted against time.

In the known valve arrangement described in the introduction, the oscillating pressure course designated P2 occurs, which is caused by a sudden or jerky opening of the main valve, as described in the introduction. Such an oscillating pressure course leads to a reduction in comfort, as described above. The pressure course designated P1 occurs in the valve arrangement according to the invention as a result of the volume flow of damping fluid designated Q1 through the valve arrangement 1. As is readily apparent, the oscillating pressure course is eliminated and the comfort losses associated with the known valve arrangement are also eliminated.

If the excitation in the form of a force shock acting on the valve arrangement 1, for example by driving over a bump in the road, causes the piston rod speed to increase further and assume values in the range of the high piston rod speed, this leads to the oil flow in the pressure stage depicted in FIG. 9. Due to the excitation, a further increasing pressure is established over the main valve 11, which acts on the main valve 11. When this force, which is caused by the pressure build-up in the pressure stage chamber PD, exceeds the counterforce on the rear side of the main valve 11, the valve discs 12 of the main valve, i.e. the valve disc 12*a*, the support disc 12*b* and the bearing discs 12*c* move completely out of contact from the valve seat 16*a*, as depicted in FIG. 9. The counterforce on the rear of the main valve 11 is determined by the rear pressurized area of the valve piston 13 multiplied by the pressure built up by the pilot valve B and the force of the spring 15.

Due to the configuration of the support disc 12*b*, the flexible valve disc 12*a* can release a passage cross-section at the annular valve seat 16*a* in a pressure-dependent manner, even if the main valve 11 is not yet fully open, since the force equilibrium described above has not yet been reached. This configuration ensures a continuous opening behavior of the main valve 11 according to the curve courses II, III in FIG. 16 according to segment "B". At high piston rod speeds corresponding to the curve course in segment "C" according to FIG. 16, the almost linear course of the damping force plotted against the damper speed is maintained.

With the spring decompression or the rebound movement of the vibration damper 42, the piston rod 2, on which the valve arrangement 1 is disposed, moves out of the region of the pressure stage chamber PD in the direction of the rebound chamber PZ. This movement leads to an increase of the system pressure in the rebound chamber and thus to an oil flow in the direction of the pressure stage chamber.

FIG. 10 shows an enlarged sectional view of the valve arrangement 1 to depict the fluid flow in the rebound stage at low and average speeds of the piston rod, which are set during the rebound movement. At low movement speeds, the main valve 11 having the valve discs 12 remains closed, and an oil flow takes place via the pilot valve B; this again corresponds to the curve course according to segment "A" in FIG. 16.

Damping fluid flows from the rebound chamber via the restrictor 27 of the main valve 11 and the check valve 7—which opens due to the system pressure—into the pre-control chamber 25 of the pilot valve B; from there fluid flows via the pilot valve B and the housing 14 or the oil duct 66 and the recesses 57, 61 and 63 (see FIG. 13), in the direction of the pressure stage chamber PD.

The sleeve body 10 is designed to hold the valve disc 12*a* and the support disc 12*b*, as well as the stop discs 12*c* in an aligned position relative to one another. This is achieved by the sleeve body 10 with its cylindrical tube segments 56 passing through the respective recesses 57, 61 and 63 of the discs 12*a*, 12*b*, 12*c* and thus ensuring that the discs are arranged such that they cannot rotate relative to one another. In this manner, the cross-sectional area of the respective recesses 57, 61 and 63 of the discs stacked on top of one another remains constant, and it is prevented that central webs 55 of the discs 12*a*, 12*b*, 12*c* can rotate in relation to one another (which would lead to a change in the cross-sectional area through which fluid can flow). The predetermined effective flow cross-section formed by the recesses is thus maintained in a predetermined manner. Even in a possible embodiment of the support disc 12*b* as a full-surface disc without clearances, this function of the sleeve body 10 would be maintained. When the piston rod speed increases, this leads to an increase in the system pressure in the rebound chamber and to an oil flow also according to the arrow 67 in FIG. 10.

As can be seen from FIG. 10 in cooperation with the configuration of the support disc 12*b* and the valve disc 12*a* shown in FIG. 13, the increase in system pressure results in damping fluid entering the region of the cut-out 68 in FIG. 10 as indicated by the oil flow arrow 67. The increase in system pressure causes a lifting away movement of the radially inner region 69 of the valve disc 12*a* from the support disc 12*b*, because the system pressure can enter the interspace 70 between the bottom of the valve disc 12*a* and the top of the first underlying bearing disc 12*c*; such interspace is not closed by the outer peripheral region of the support disc 12*b*, since the latter is not formed over the entire surface in this region, but has clearances 76, and the valve disc 12*a* only abuts the upper side of the support disc 12*b* in the region of the projections 58.

The oil flow 71 thus established allows the system pressure to relax, and a sudden or abrupt or jerky lifting of the valve discs 12 (i.e., the valve disc 12*a*, support disc 12*b*, beating discs 12*c*) from the annular valve seat 16*a* is avoided. The second or lower bearing disc 12*c* is still in contact with the annular valve seat 16*b*, as seen in FIG. 10. This corresponds to the course of the damping force plotted against the damper speed according to segment "B" in FIG. 16.

Figure 11:
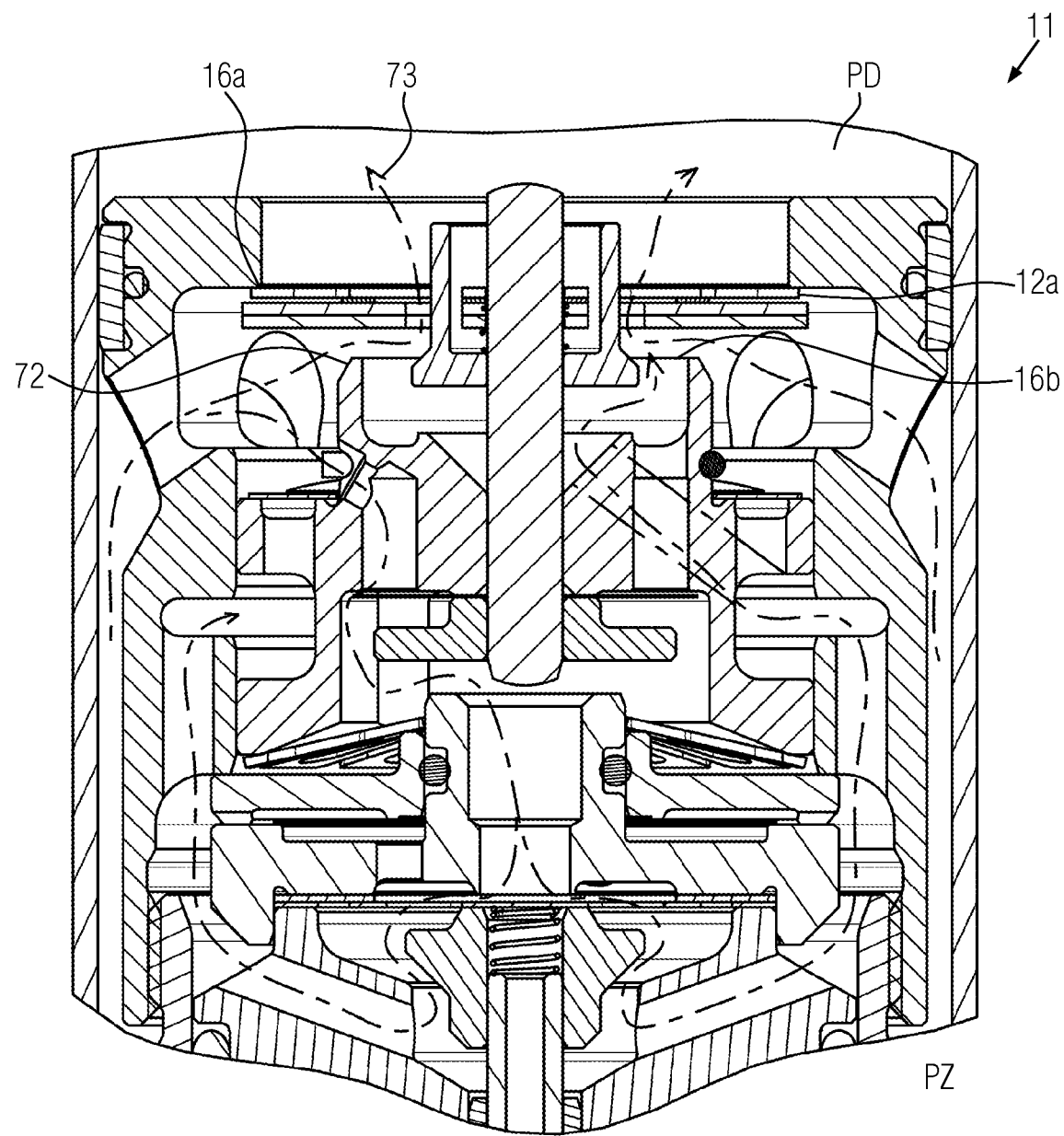
FIG. 11 is an enlarged sectional view of the valve arrangement, depicting the fluid flow in the rebound stage at a high speed of the piston rod.

If the piston rod speed continues to increase, the damping fluid course depicted in FIG. 11 of the drawing occurs.

As is readily apparent, the valve disc 12*a* continues to be in contact with the annular valve seat 16*a*. The increasing system pressure causes the main valve 11 to open, since the counterforce acting on the rear side of the valve piston 13 is exceeded and the annular valve seat 16*b* opens because the valve piston 13 removes its control edge 72 from the bearing disc 12*c*, and thus enables a gap which leads to the passage of damping fluid in accordance with the arrow 73 shown in FIG. 11.

The counterforce acting on the valve piston 13 is determined by the rear pressurized area of the valve piston 13 multiplied by the pressure built up by the pilot valve B and the preload force of the spring washer 15. When the force prevailing due to the increase in system pressure in the rebound chamber PZ and acting on the main valve 11 becomes greater than the counterforce defined above, the gap between the control edge 72 and the bearing disc 12c opens, and oil flow can take place through the recesses 57, 61 and 63 of the bearing discs 12c, support disc 12b and the valve disc 12a, as is depicted by the oil flow arrow 73 of FIG. 11. This leads to a build-up of a damping force plotted against the damper speed corresponding to segment "C" in FIG. 16.

The valve arrangement according to the present disclosure can therefore also release the passage cross-section of the main valve 11 during the rebound movement depending on the system pressure, even if the main valve 11 has not yet lifted off the annular valve seat 16. This also contributes to a continuous opening behavior of the main valve in the region of the segment "B", i.e., at average damper speeds or piston rod speeds, during the rebound movement, and the course of the damper force plotted against the damper speed can be influenced by the configuration of the support disc 12b having two or more projections 58.

The configuration of the support disc 12b having two projections or wings 58 leads to a straighter course III of the damper force plotted against the damper speed in the range of average piston rod speeds, whereas the design of the support disc 12b (having four projections or wings 58) leads to a slightly rounded course II of the damper force. FIG. 16 depicts the course of the damper force over the damper speed at a high current supply to the electromagnet 4, and the course of the respective curves II, III can be changed by a corresponding change in the current supply to the coil 6 of the electromagnet 4.

As can be seen in FIG. 15, the valve arrangement according to the present invention can effectively avoid the problem of overshooting of the system pressure course and the resulting comfort disadvantages. With regard to features of the invention that are not explained in detail above, reference is expressly made also to the claims and the drawing.

REFERENCE NUMERAL LIST

1. Valve arrangement
2. Piston rod
3. Tube
4. Electromagnet
5. Housing
6. Coil
7. Check valve
8. Check valve
9. Check valve
10. Check valve, sleeve body
11. Main valve
12. Valve discs
12a. Valve disc
12b. Support disc
12c. Bearing disc
13. Valve piston
14. Valve housing
15. Spring washer
16a. Annular valve seat
16b. Annular valve seat
17. Armature
18. Valve spring
19. Sealing body
20. Spring
21. Valve seat
22. Operating valve
23. Emergency valve disc, emergency valve
24. Drain valve
25. Pre-control chamber
26. Passage
27. Passage
28. Spacer disc
29. Spring
30. Valve seat
31. Adjusting discs
32. O-ring
33. Cover disc
34. Stop disc
35. Spring washer
36. Snap ring
37. Guide pin
38. Longitudinal axis
39. Inner space of the valve housing
40. Telescopic suspension fork leg
41. Axle clamp
42. Vibration damper
43. Inner space
44. Spring
45. Abutment
46. Sealing device
47. Outer cone
48. Supporting edge
49. Recess of the disc 18
50. Collar
51. Wall
52. Body
53. Base
54. Recesses
55. Central web
56. Tube segment
57. Recess of the beating disc
58. Projection of the support disc
59. Circular region of the support disc
60. Second region of the support disc
61. Recess
62. Edge region
63. Recess
64. Oil flow, arrow
65. Arrow
66. Oil duct
67. Oil flow
68. Cut-out
69. Radially inner region
70. Interspace
71. Oil flow
72. Control edge
73. Arrow
74. Contact surface side
75. Bearing surface side
76. Clearance
77. Slot
78. Inner recess
80. Motorbike
81. Full-floating axle
82. Front wheel
83. Rear wheel
PD: pressure stage chamber
PZ: rebound chamber
H: vertical axis direction H1: vertical axis direction
B: pilot valve Only some embodiments of the invention and but a few examples of its versatility are described in the present disclosure. It is understood that the invention is capable of use in various other combinations and is capable of changes or modifications within the scope of the inventive concepts expressed herein. Thus, although the invention has been described in detail with particular reference to these preferred embodiments, other embodiments can achieve the same results. Variations and modifications of the present invention will be obvious to those skilled in the art and it is intended to cover with the appended claims all such modifications and equivalents.

What is claimed is:

1. A valve arrangement for a vibration damper, having a valve housing having an annular valve seat and provided to receive damping fluid, and having a valve piston which is arranged in an axially displaceable manner relative to the valve seat in an inner space of the valve housing, and the valve piston has a main valve which has a flexible circular valve contact disc which can be brought into removable contact with a contact surface side on the valve seat, and further comprising:
   the valve contact disc is arranged on the valve piston by means of a guide pin whereby the valve contact disc is movable axially relative to the guide pin and is guided radially;
   an electromagnet having an armature for acting on a pilot valve; and
   a support disc, arranged on a bearing surface side of the valve contact disc facing away from a contact surface side of the valve contact disc, on which support disc the valve contact disc abuts along a partial peripheral region extending in a peripheral direction of the valve contact disc, the support disc comprising:
      a first region circular in plan view with a first diameter smaller than an outer diameter of the valve contact disc; and
      at least one second region, with a second diameter, extending radially outwards from an outer periphery of the first region, the second region extending along a partial region of the periphery of the support disc in the peripheral direction of the support disc;
   wherein the support disc has at least one clearance in the peripheral direction, at which the valve contact disc is free from support by the support disc, and the valve contact disc deflects more strongly in a region of the clearance than in a region of the support disc without a clearance when pressure is applied in the direction of the support disc.

2. The valve arrangement according to claim 1, wherein the support disc comprises at least two radially outwardly extending, mutually opposite projections which, viewed from the center of the support disc, have a radial extent smaller than or equal to the outer diameter of the valve contact disc.

3. The valve arrangement according to claim 1, wherein the valve arrangement comprises at least one bearing disc on which the support disc abuts with its side facing away from the valve contact disc.

4. The valve arrangement according to claim 1, wherein the valve arrangement comprises a tubular sleeve body having, along a partial region of its longitudinal extension, a slot defined in the wall of the sleeve body having mutually opposite recesses, and cylindrical tube segments formed adjacent to the recesses, extending away from a base of the sleeve body and running in the longitudinal direction of the sleeve body.

5. The valve arrangement according to claim 4, further comprising two recesses defined within the outer periphery of the valve contact disc or of the support disc, between which recesses a central web is provided, and wherein the recesses are penetrated by the tube segments.

6. The valve arrangement according to claim 1, wherein the pilot valve has a sealing body with an outer cone, and is contactable with an annular valve seat of a drain valve by a spring means.

7. The valve arrangement according to claim 1, wherein the pilot valve has a valve disc which, when the electromagnet is de-energized, allows a fluid flow from a pre-control chamber of the pilot valve via the valve housing.

8. The valve arrangement according to claim 1, wherein the valve contact disc defines an inner recess having a larger diameter than the support disc arranged below it in a vertical axis direction of the valve arrangement, and an edge region of the inner recess lifts off from the support disc, in the direction out of the inner space of the valve housing, when pressurized with damping fluid.

9. The valve arrangement according to claim 8, wherein the valve contact disc comprises an edge region arranged on the outer diameter which lifts off from the valve seat, in a direction into the inner space, when pressurized with damping fluid in the direction of the inner space.

10. A vibration damper having a tube and a piston rod, wherein the tube has an inner space adapted to receive damping fluid, and characterized by:
   a valve arrangement according to claim 1; and
   a pressure stage chamber and a rebound chamber;
   wherein the pressure stage chamber and the rebound chamber each has a respective inner space, physically separated from the valve arrangement, and the chambers are fluidically connected.

11. A vehicle having a front wheel and a rear wheel, characterized by a vibration damper according to claim 10.

12. A valve arrangement for a vibration damper, having a valve housing having an annular valve seat and provided to receive damping fluid, and having a valve piston which is arranged in an axially displaceable manner relative to the valve seat in an inner space of the valve housing, and the valve piston has a main valve which has a flexible circular valve contact disc which can be brought into removable contact with a contact surface side on the valve seat, and further comprising:
   the valve contact disc is arranged on the valve piston by means of a guide pin whereby the valve contact disc is movable axially relative to the guide pin and is guided radially;
   an electromagnet having an armature for acting on a pilot valve;
   a support disc, arranged on a bearing surface side of the valve contact disc facing away from a contact surface side of the valve contact disc, on which support disc the valve contact disc abuts along a partial peripheral region extending in a peripheral direction of the valve contact disc; and
   a tubular sleeve body having, along a partial region of its longitudinal extension, a slot defined in the wall of the sleeve body having mutually opposite recesses, and cylindrical tube segments formed adjacent to the recesses, extending away from a base of the sleeve body and running in the longitudinal direction of the sleeve body;

wherein:
the support disc has at least one clearance in the peripheral direction, at which the valve contact disc is free from support by the support disc; and
the valve contact disc deflects more strongly in a region of the clearance than in a region of the support disc without a clearance when pressure is applied in the direction of the support disc.

13. The valve arrangement according to claim 12 wherein the support disc comprises:
a first region circular in plan view with a first diameter smaller than an outer diameter of the valve contact disc; and
at least one second region, with a second diameter, extending radially outwards from an outer periphery of the first region, the second region extending along a partial region of the periphery of the support disc in the peripheral direction of the support disc.

14. The valve arrangement according to claim 12, wherein the support disc comprises at least two radially outwardly extending, mutually opposite projections which, viewed from the center of the support disc, have a radial extent smaller than or equal to the outer diameter of the valve contact disc.

15. The valve arrangement according to claim 12 comprising at least one bearing disc on which the support disc abuts with its side facing away from the valve contact disc.

16. The valve arrangement according to claim 12, further comprising two recesses defined within the outer periphery of the valve contact disc or of the support disc, between which recesses a central web is provided, and wherein the recesses are penetrated by the tube segments.

17. The valve arrangement according to claim 12, wherein the pilot valve has a sealing body with an outer cone, and is contactable with an annular valve seat of a drain valve by a spring means.

18. The valve arrangement according to claim 12, wherein the pilot valve has a valve disc which, when the electromagnet is de-energized, allows a fluid flow from a pre-control chamber of the pilot valve via the valve housing.

* * * * *